(12) United States Patent
Iida et al.

(10) Patent No.: US 7,979,693 B2
(45) Date of Patent: Jul. 12, 2011

(54) RELAY APPARATUS FOR ENCRYPTING AND RELAYING A FRAME

(75) Inventors: Takamitsu Iida, Kawasaki (JP); Hideshi Sakurai, Kawasaki (JP); Satoshi Obara, Kawasaki (JP); Yukihiro Nakajima, Kawasaki (JP); Takayuki Sakuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1076 days.

(21) Appl. No.: 11/622,750

(22) Filed: Jan. 12, 2007

(65) Prior Publication Data

US 2008/0052533 A1 Feb. 28, 2008

(30) Foreign Application Priority Data

Aug. 9, 2006 (JP) ................................. 2006-216737

(51) Int. Cl.
*H04L 29/06* (2006.01)
*H04L 9/32* (2006.01)
*G06F 11/30* (2006.01)
*G06F 12/14* (2006.01)

(52) U.S. Cl. ......... 713/153; 713/189; 713/181; 713/187

(58) Field of Classification Search .................. 713/153, 713/189, 181, 187
See application file for complete search history.

(56) References Cited

U.S. PATENT DOCUMENTS

| | | | |
|---|---|---|---|
| 6,775,769 B1* | 8/2004 | Inada et al. .................. | 713/153 |
| 7,177,424 B1 | 2/2007 | Furuya et al. | |
| 7,209,560 B1* | 4/2007 | Fairman et al. .............. | 380/255 |
| 7,232,063 B2 | 6/2007 | Fandel et al. | |
| 7,246,224 B2 | 7/2007 | Rothman et al. | |
| 2001/0021253 A1 | 9/2001 | Furuya et al. | |
| 2001/0021254 A1 | 9/2001 | Furuya et al. | |
| 2002/0164024 A1* | 11/2002 | Arakawa et al. .............. | 380/210 |
| 2003/0048899 A1 | 3/2003 | Spacey | |
| 2003/0210696 A1* | 11/2003 | Goldflam .................. | 370/395.1 |
| 2004/0028058 A1 | 2/2004 | Katoh | |
| 2004/0111631 A1 | 6/2004 | Kocher et al. | |
| 2004/0177369 A1 | 9/2004 | Akins | |

(Continued)

FOREIGN PATENT DOCUMENTS

JP 5-85140 11/1993
JP 2003-60633 2/2003

OTHER PUBLICATIONS

S. Kent et al., "Security Architecture for the Internet Protocol", *Network Working Group*, Request for Comments: 4301, [Online] Web URL: <http://www.ietf.org/rfc/rfc4301.txt>, Dec. 2005.

(Continued)

*Primary Examiner* — Kambiz Zand
*Assistant Examiner* — Aubrey H Wyszynski
(74) *Attorney, Agent, or Firm* — Fujitsu Patent Center

(57) ABSTRACT

A relay apparatus comprises a frame relay processing unit for relaying a frame, a plurality of ports for sending and receiving the frame to and from the outside, and a cryptographic processing module corresponding to each of the ports. Each cryptographic processing module is connected to the corresponding port and to the frame relay processing unit by means of general-purpose interfaces such as MII. The cryptographic processing module performs the encryption process and decryption process so that the frame relay processing unit can concentrate on the relay process and the relay speed is not subject to degradation. Also, the cryptographic processing module can generate a different cryptographic key for each frame without requiring dynamic exchange of key information.

20 Claims, 15 Drawing Sheets

U.S. PATENT DOCUMENTS

| | | | |
|---|---|---|---|
| 2004/0213237 | A1 | 10/2004 | Yasue et al. |
| 2004/0252836 | A1 | 12/2004 | Yoshida et al. |
| 2005/0254656 | A1 | 11/2005 | Rose et al. |
| 2005/0286537 | A1 | 12/2005 | Shimada |
| 2006/0013141 | A1 | 1/2006 | Mutoh et al. |
| 2006/0015751 | A1 | 1/2006 | Brickell et al. |
| 2006/0062391 | A1* | 3/2006 | Lee et al. .................. 380/270 |
| 2006/0126500 | A1 | 6/2006 | Wakai et al. |
| 2006/0269066 | A1* | 11/2006 | Whitehead et al. .......... 380/270 |
| 2006/0274899 | A1 | 12/2006 | Zhu et al. |
| 2007/0242828 | A1 | 10/2007 | Lindteigen |
| 2008/0075076 | A1 | 3/2008 | Shimada |
| 2008/0085004 | A1 | 4/2008 | Kitaj et al. |
| 2008/0215897 | A1 | 9/2008 | Doyle et al. |

OTHER PUBLICATIONS

R. Housley et al., "EtherIP: Tunneling Ethernet Frames in IP Datagrams", *Network Working Group*, Request for Comments: 3378, [Online] Web URL: <http://www.ietf.org/rfc/rfc3378.txt> Sep. 2002.

J. Lau et al., "Layer Two Tunneling Protocol—Version 3 (L2TPv3)", *Network Working Group*, Request for Comments:3931, [Online] Web URL: <http://www.ietf.org/rfc/rfc3931.txt>, Mar. 2005.

USPTO: Final Office Action mailed Jan. 24, 2011 in corresponding U.S. Appl. No. 11/741,051.

U.S. Office Action, mailed Jun. 1, 2010, and corresponding to U.S. Appl. No. 11/741,051.

* cited by examiner

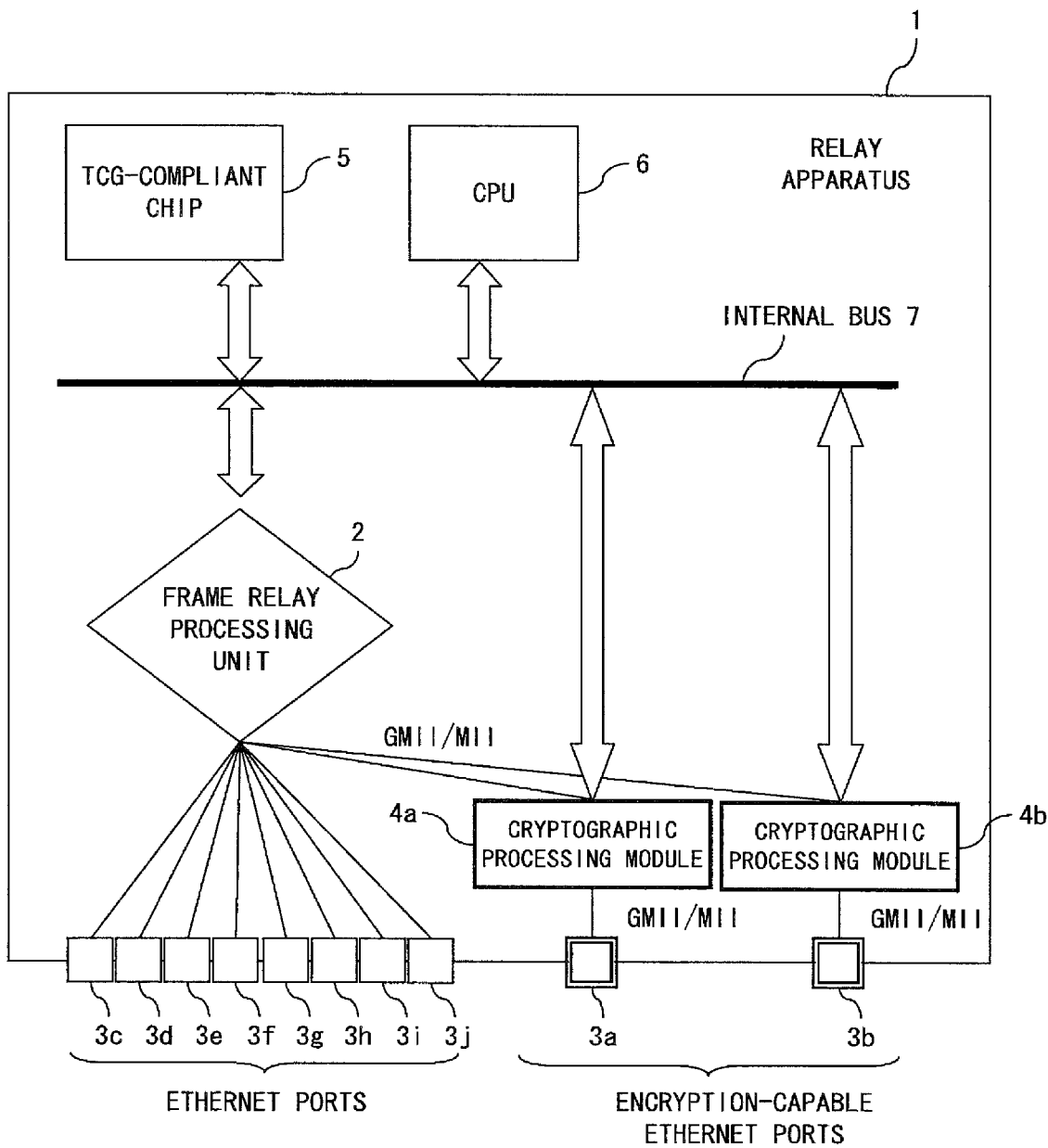
F I G. 2

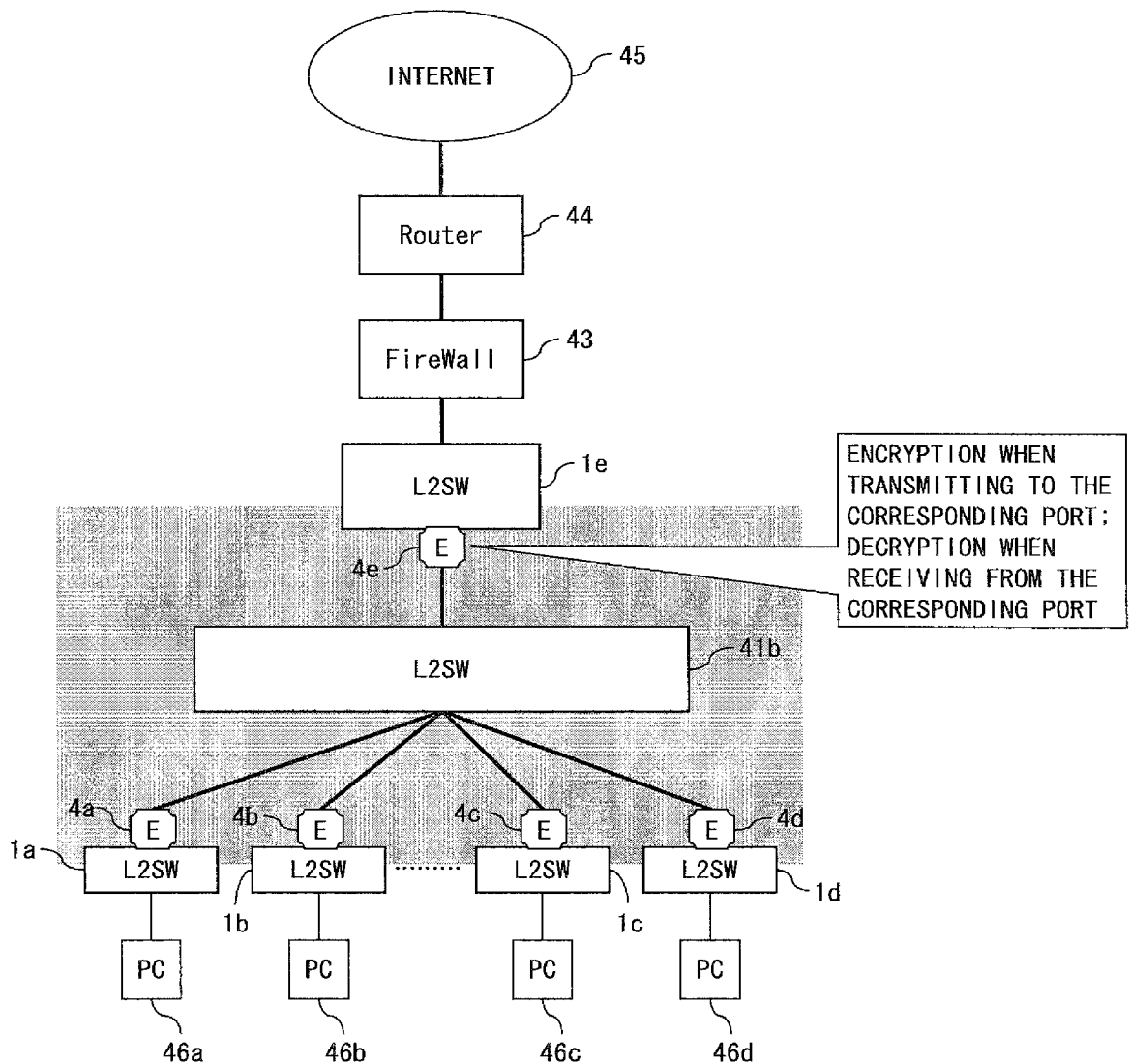
F I G. 6A

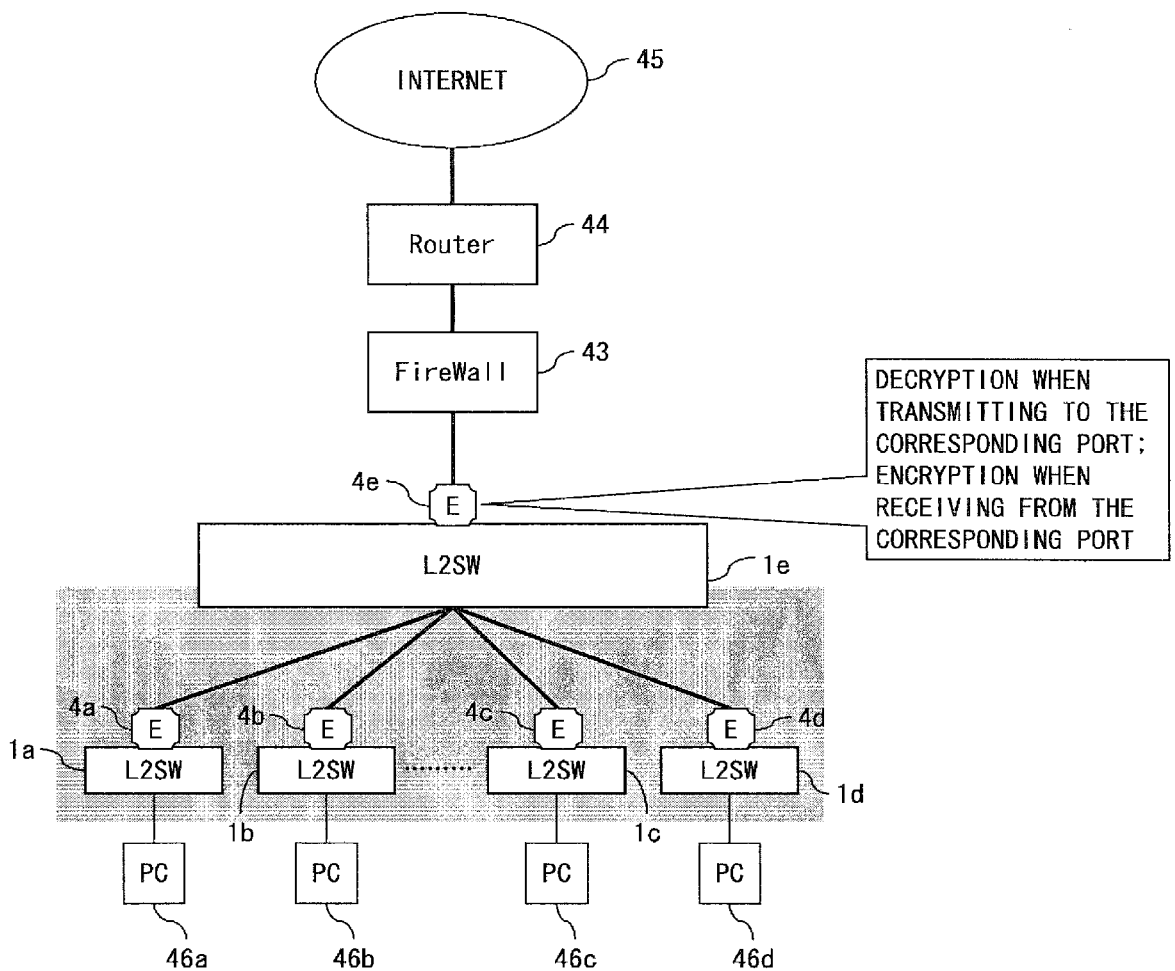
F I G. 8A

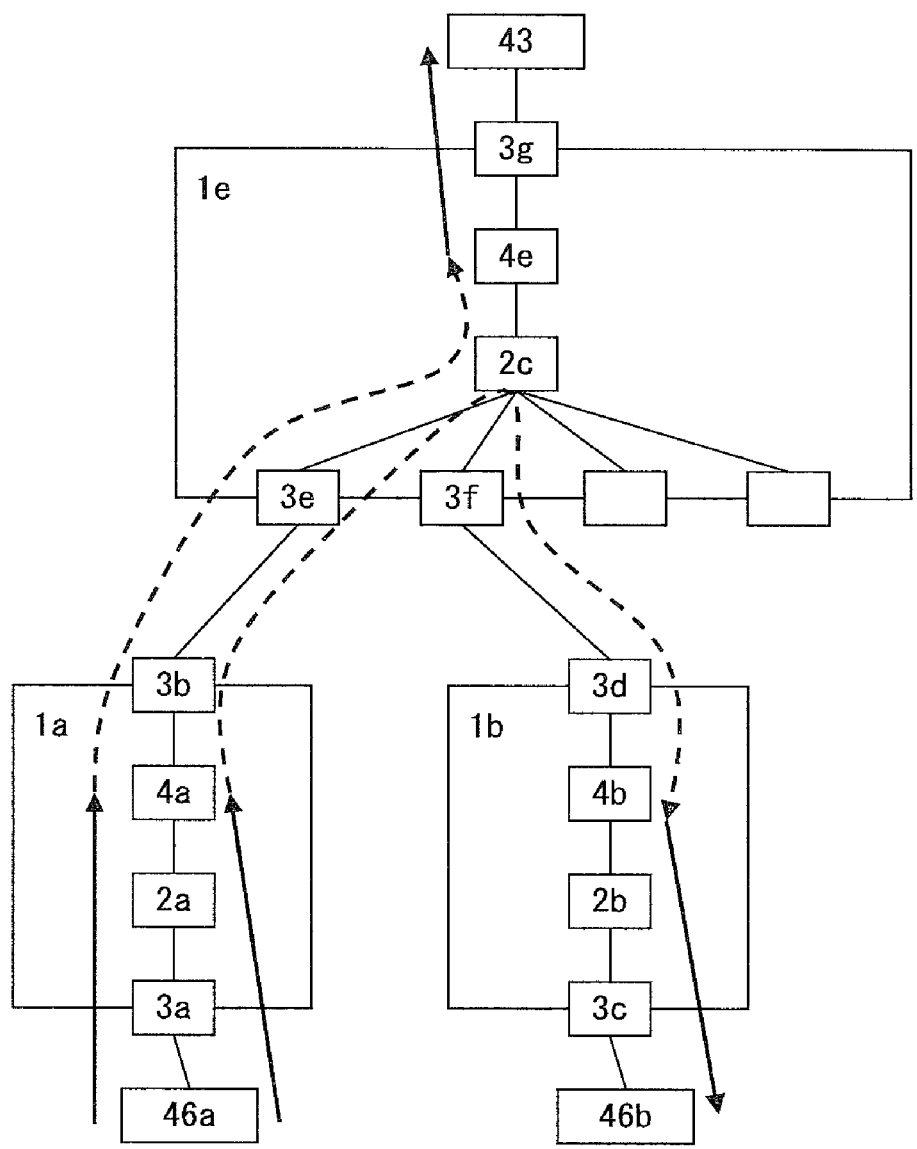
F I G. 8B

RELAY APPARATUS FOR ENCRYPTING AND RELAYING A FRAME

BACKGROUND OF THE INVENTION

1. Field of the Invention

The present invention relates to an apparatus for realizing a secret communication by encrypting and relaying frames in the data link layer.

2. Description of the Related Art

Ethernet has been widely used for purposes ranging from personal use to corporate backbone systems because it realizes high-speed communications such as 10 Mbps, 100 Mbps, and 1 Gbps, and communications equipment such as NICs (Network Interface Cards), hubs, switches, and cables are affordable and easily available.

The Ethernet standard defines the specifications of the physical layer (also referred to as Layer 1) and the data link layer (also referred to as Layer 2) in the OSI (Open Systems Interconnection) reference model. Layer 2 is further divided into two sublayers according to the IEEE (Institute of Electrical and Electronic Engineers) 802.3 standard in which Ethernet was standardized. The sublayer close to Layer 1 is the MAC (Media Access Control) sublayer, and the one close to the network layer (also referred to as Layer 3) is the LLC (Logical Link Control) sublayer. In Layer 2, data is sent and received in units of frames.

Although Ethernet is widely used as described above, the communication itself with Ethernet has not been encrypted. That is, frames sent and received are not encrypted. Thus, when the communication is intercepted, important information is leaked out.

When using a repeater hub, all terminals connected to the same hub can intercept the communication. When using a switching hub, while it is normally impossible to intercept the communication of other terminals, the communication can be easily intercepted by using offensive methods such as ARP (Address Resolution Protocol) spoofing and MAC flooding. For this reason, there has arisen a need for encrypting the Ethernet communication in order to keep communication contents confidential.

The encryption of the Ethernet communication itself is possible by using existing protocols. There are several methods, as described below, and all have problems.

The first method is to combine IPsec, described in nonpatent literature 1, and EtherIP, described in nonpatent literature 2 (the method is also called "EtherIP over IPsec").

IPsec is an architecture for securing Internet communications, including the technology of encrypting IP (Internet Protocol) packets. EtherIP is a method for realizing the Ethernet communication on the IP. Therefore, the Ethernet communication can be encrypted by using the combination of IPsec and EtherIP.

The second method is to combine the IPsec described in nonpatent literature 1 and L2TPv3, described in nonpatent literature 3. L2TPv3 is a method for transmitting a Layer 2 frame on the IP. Therefore, the Ethernet communication can be encrypted by using the combination of IPsec and L2TPv3.

The third method is to encrypt the MAC sublayer, which is now in preparation and will be standardized as IEEE802.1AE. The Ethernet communication can be encrypted by encrypting the MAC sublayer.

[Nonpatent literature 1]

RFC4301 Security Architecture for the Internet Protocol
http://www.ietf.org/rfc/rfc4301.txt
(Access confirmed: Jul. 28, 2006)

[Nonpatent literature 2]

RFC3378 EtherIP: Tunneling Ethernet Frames in IP Datagrams
http://www.ietf.org/rfc/rfc3378.txt
(Access confirmed: Jul. 28, 2006)

[Nonpatent literature 3]

RFC 3931 Layer Two Tunneling Protocol—Version 3 (L2TPv3)
http://www.ietf.org/rfc/rfc3931.txt
(Access confirmed: Jul. 28, 2006)

However, the first method has the following problems.

(a) According to EtherIP, an EtherFrame can be transferred only to a specific destination, which results in the limitation to the one-to-one communication topology. That is, the method is only capable of encrypting the communication between a pair of switches having a one-to-one relationship. In a general office LAN (Local Area Network), however, N-to-N communication is often conducted.

(b) Since EtherIP does not perform a bridge operation, it does not learn a MAC address and cannot avoid unnecessary transfers, which generates unnecessary traffic.

(c) It uses a complicated protocol stack comprising IP, IPsec, and EtherIP. The protocol stack is complicated because it comprises these three protocols, IP requires routing, and IPsec requires key exchange. Since the protocol stack is complicated, the configuration definition is also complicated. Accordingly, communications equipment is not easy to operate and maintain.

(d) Since the protocol stack is complicated, realization as hardware is difficult. Meanwhile, realization as software results in a longer processing time. Therefore, it is difficult to realize a Gbps-class function.

The second method also has the same problems as the first method.

The third method also has the following problems.

(e) The switch as the participant of the cryptographic communication needs to be identified, and the key needs to be exchanged with each participating switch using a key exchange protocol. Accordingly, it is not suitable for a topology in which a plurality of switches perform the encrypted communication in an N-to-N relationship since the process becomes too complicated.

(f) The granularity of encryption is in units of physical interfaces. That is, frames sent and received between two specific switches are either all encrypted or all not encrypted. Therefore, it cannot handle a smaller granularity to determine whether or not to perform the encryption for each VLAN (Virtual LAN).

SUMMARY OF THE INVENTION

It is an object of the present invention to provide a relay apparatus, having a configuration that does not degrade the relay speed and a configuration suitable for the encrypted communications in N-to-N relationships, for encrypting and relaying frames in the data link layer.

The relay apparatus of the present invention relays a frame in the data link layer and comprises a plurality of ports for transmitting and receiving the frame to and from an outside of the relay apparatus, a frame relay processing unit for relaying the frame, and one or more cryptographic processing units.

The cryptographic processing unit has a first interface for transmitting and receiving the frame to and from one of the plurality of ports and a second interfaces for transmitting and receiving the frame to and from the frame relay processing unit. The cryptographic processing unit also performs an encryption process when receiving the frame from either one of the first interface or the second interface by encrypting the frame and generating an encrypted frame, and performs a decryption process when receiving the encrypted frame from the other one of the first interface or the second interface by decrypting the encrypted frame.

In addition, it is desirable for the cryptographic processing unit to comprise a number storage unit for storing a sequence number in order to use the sequence number for the encryption process and the decryption process. That is, it is desirable, when performing the encryption process, for the cryptographic processing unit to generate a cryptographic key on the basis of the sequence number, to generate the encrypted frame by encrypting the frame using the cryptographic key, to incorporate the sequence number into the encrypted frame, and to change a value of the sequence number stored in the number storage unit. It is also desirable, when performing the decryption process, for the cryptographic processing unit to generate the cryptographic key on the basis of the sequence number incorporated into the encrypted frame and to perform the decryption process using the cryptographic key.

According to the present invention, since the relay apparatus comprises the cryptographic processing unit, a frame can be encrypted and the encrypted frame can be relayed.

Also, since the encryption process and decryption process are performed in the cryptographic processing unit disposed separately from the frame relay processing unit, the frame relay processing unit is simply required to perform the relay process. Therefore, a higher relaying speed can be maintained with the relay apparatus of the present invention than in an apparatus that performs the encryption process and the decryption process in the frame relay processing unit.

In addition, while each cryptographic processing unit is disposed corresponding to one of a plurality of ports, users can arbitrarily determine matters such as the number of cryptographic processing units provided for one relay apparatus and to which port a cryptographic processing unit is correspondingly disposed according to circumstances. Therefore, the present invention is applicable to various network configurations.

Also, by using the cryptographic key based on the sequence number as mentioned above, there is no longer a need for dynamically exchanging key information. It is also possible to generate the cryptographic key with a relatively simple configuration. Therefore, the encryption process and the decryption process degrade the relay speed of the entire relay apparatus to a smaller degree.

BRIEF DESCRIPTION OF THE DRAWINGS

FIG. 2 is a block diagram of a relay apparatus according to another embodiment of the present invention.

FIG. 6A shows a configuration example of a network using the relay apparatus of the present invention.

FIG. 8A shows a configuration example of a network using the relay apparatus according to the present invention.

FIG. 8B is an extract of a part of FIG. 8A, showing the apparatuses in detail and the flow of a frame.

DESCRIPTION OF THE PREFERRED EMBODIMENTS

The preferred embodiments of the present invention are described in detail below with reference to the drawings. For items that are essentially identical, the same numerals or numerals differing only in subscripts are assigned.

The frames sent and received in Layer 2 can be, for example, a MAC frame of DIX Ethernet or a MAC frame of IEEE802.3, which differ in their details but are almost identical in formats. The distinction is not important in the present invention. Therefore, the simple expression "frame" is used hereinafter as the generic term for those MAC frames.

Figure 1:
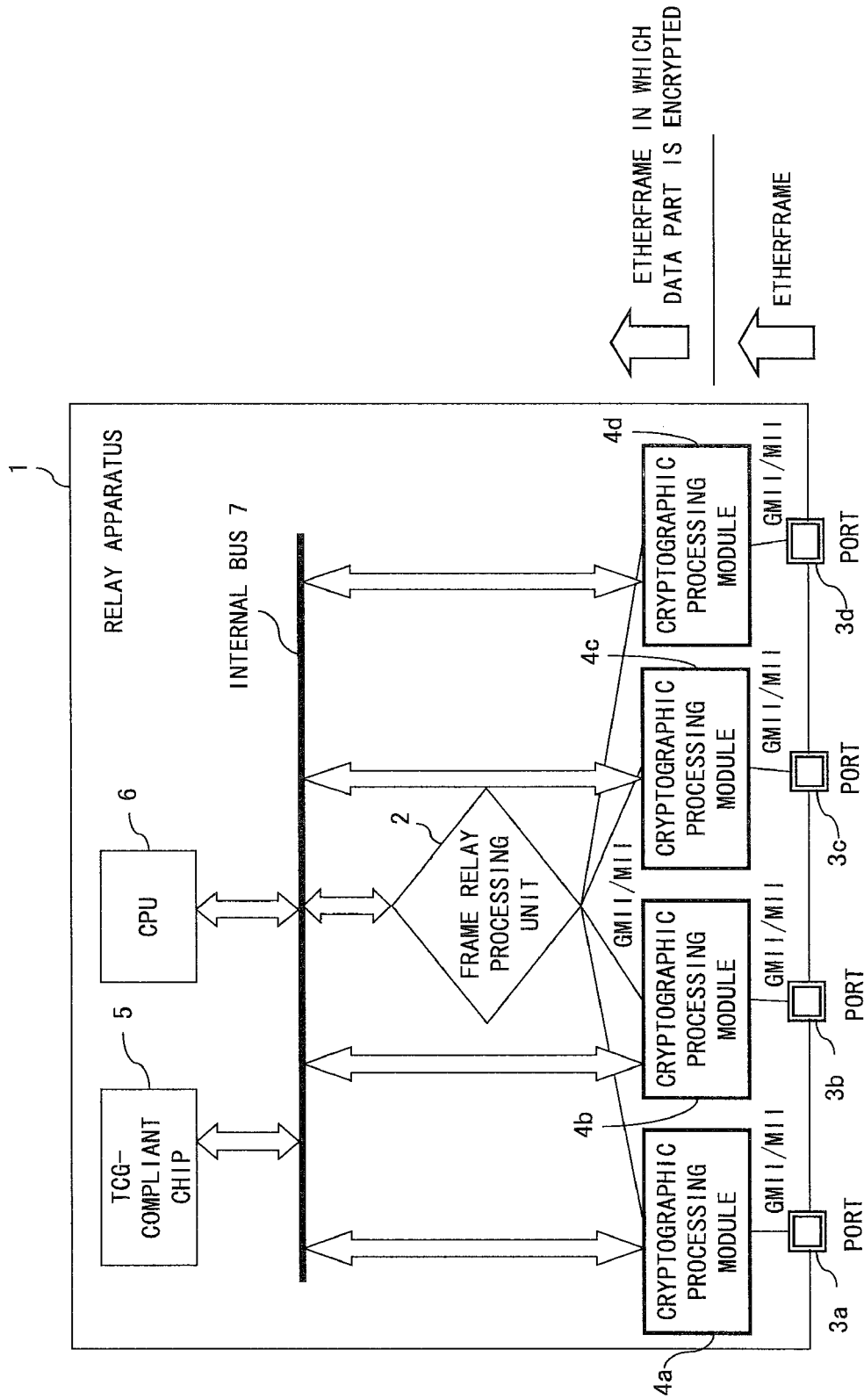
FIG. 1 is a block diagram of a relay apparatus according to an embodiment of the present invention.

FIG. 1 is a block diagram of a relay apparatus according to an embodiment of the present invention. By utilizing the relay apparatus 1 in FIG. 1, a frame can be encrypted to realize a secret communication between the relay apparatuses (switches). The conventional Ethernet communication has a downside not only in that no encryption process is performed with the communication, but also that the Ethernet communication is subject to easy wiretapping. By utilizing the relay apparatus 1 of the present invention, however, the secrecy of a communication can be maintained even if wiretapping occurs since the frame is encrypted.

The relay apparatus 1 according to the present invention is a switching apparatus for relaying a frame; specifically, for example, a switching hub. In other words, the relay apparatus 1 has a relay function in Layer 2, which is a type of L2 switch. The relay apparatus 1 is similar to conventional ones in that it comprises a plurality of physical ports (in FIG. 1 there are four ports 3a-3d) for sending and receiving a frame to and from the outside and in that it also comprises a frame relay processing unit 2 for relaying frames.

The relay apparatus 1 further comprises cryptographic processing modules 4a-4d corresponding to the respective ports 3a-3d. Each of the cryptographic processing modules 4a-4d may be produced as a single chip. The cryptographic processing modules 4a-4d are respectively connected to the corresponding ports 3a-3d and the frame relay processing unit 2 by means of general-purpose interfaces such as GMII (Gigabit Medium Independent Interfaces) and MII (Medium Independent Interfaces). Therefore, the input and output of the cryptographic processing modules 4a-4d are both frames. GMII and MII are interfaces between Layer 1 and the MAC sublayer, which are commonly used with Ethernet.

As described in detail later, the cryptographic process performed by the cryptographic processing modules 4a-4d includes the encryption process and decryption process.

Hereinafter, the term "cryptographic process" is used to mean the "encryption process and decryption process."

The relay apparatus 1 also comprises a TCG-compliant chip 5 complying with the TCG (Trusted Computing Group) specification. The TCG-compliant chip 5 stores data such as a pre-shared key k0 and a firm character string fs described later. The data relates to a cryptographic key and is used by the cryptographic processing modules 4a-4d. Since the data stored in the TCG-compliant chip 5 cannot be fraudulently taken out, the use of the TCG-compliant chip 5 enables the secure storage of the data.

The relay apparatus 1 also comprises a CPU (Central Processing Unit) 6. The CPU 6 operates in accordance with, for example, a program stored in ROM (Read Only Memory) not shown in the drawings, and uses RAM (Random Access Memory), also not shown in the drawings, as working memory. As described later, the CPU 6 gives instructions to the cryptographic processing modules 4a-4d such as instructions to generate data required for the cryptographic process.

The frame relay processing unit 2, cryptographic processing modules 4a-4d, TCG-compliant chip 5, CPU 6, ROM, and RAM are connected to an internal bus 7.

A feature of the relay apparatus 1 is that the frame relay processing unit 2 and the cryptographic processing modules 4a-4d are separated. This separates the frame relay process and cryptographic process, making the relay process easy and eliciting a performance with respect to the relay speed.

Among conventional apparatuses, there is an apparatus that performs a cryptographic process in the frame relay processing unit. However, with such an apparatus, the relay process is complicated and it is difficult to maintain the performance with respect to the relay speed. This is because all frames to be relayed have to go through processes in which it is determined whether or not the frame is the object of the encryption and processes to read the cryptographic key to be used.

By contrast, the relay apparatus 1 of the present invention is equipped with the cryptographic processing modules 4a-4d corresponding to the respective physical ports 3a-3d and the cryptographic process is performed separately from the frame relay process. Therefore, the frame relay processing unit 2 in the relay apparatus 1 of the present invention does not have to do anything with the cryptography and is simply required to operate in the same manner as the frame relay processing unit in a conventional relay apparatus that does not perform the cryptographic process at all.

In order to separate the relay process and cryptographic process as described above, the interface between the frame relay processing unit 2 and the cryptographic processing modules 4a-4d is an interface such as GMII, MII or the like. In the case of the conventional relay apparatus that does not perform the cryptographic process at all, the frame relay processing unit is connected to the port by means of an interface such as GMII or MII and performs the frame relay process via the interface. In the same manner, the frame relay processing unit 2 in FIG. 1 performs only the frame relay process via an interface such as GMII or MII.

Another feature of the relay apparatus 1 is that it comprises the cryptographic processing modules 4a-4d corresponding to the respective ports 3a-3d. In the conventional methods such as "EtherIP over IPsec", the transfer of a frame is limited to only one destination. Therefore, the method was able to be used between only two switches conducting the secret communication in a one-to-one relationship. By using the relay apparatus 1 of the present invention, however, the Ethernet communication can be encrypted in the N-to-N topology commonly used in general office environments. The "N-to-N topology" mentioned here does not represent physical cable wiring but represents a situation in which a plurality of relay apparatuses perform cryptographic communications respectively between a plurality of relay apparatuses.

FIG. 2 is a block diagram of a relay apparatus according to another embodiment of the present invention. The difference between FIG. 2 and FIG. 1 is that the cryptographic processing modules 4a and 4b are provided for only some of the ports (3a and 3b). Other ports (3c-3j) are directly connected to the frame relay processing unit 2 by means of an interface such as GMII or MII without being equipped with the cryptographic processing module. In other words, in the relay apparatus 1 of the present invention, the cryptographic processing modules may be provided either for only some of the ports or for all of the ports depending on need for encrypted communication and the like.

In addition, for the frame relay processing unit 2, both the interfaces between the cryptographic processing modules 4a and 4b and the interfaces between ports 3c-3j without the cryptographic processing module are the same interfaces (for example, GMII or MII). Therefore, the frame relay processing unit 2 can concentrate on the relay of frames without distinguishing between the ports that are equipped with the cryptographic processing modules and the ones that are not.

Figure 3A:
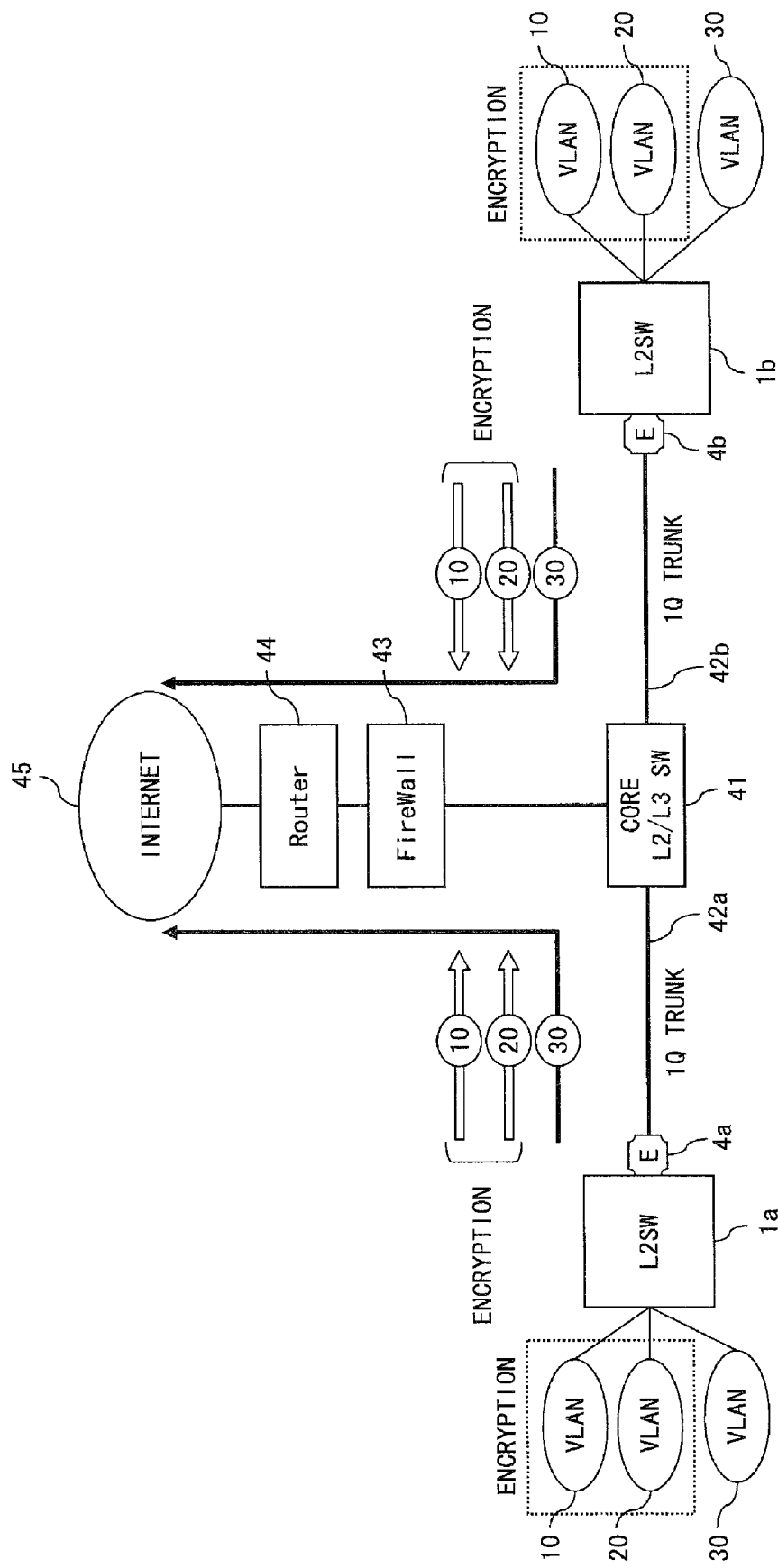
FIG. 3A shows an example of the use of the relay apparatus according to the present invention in a VLAN environment.
Figure 3B:
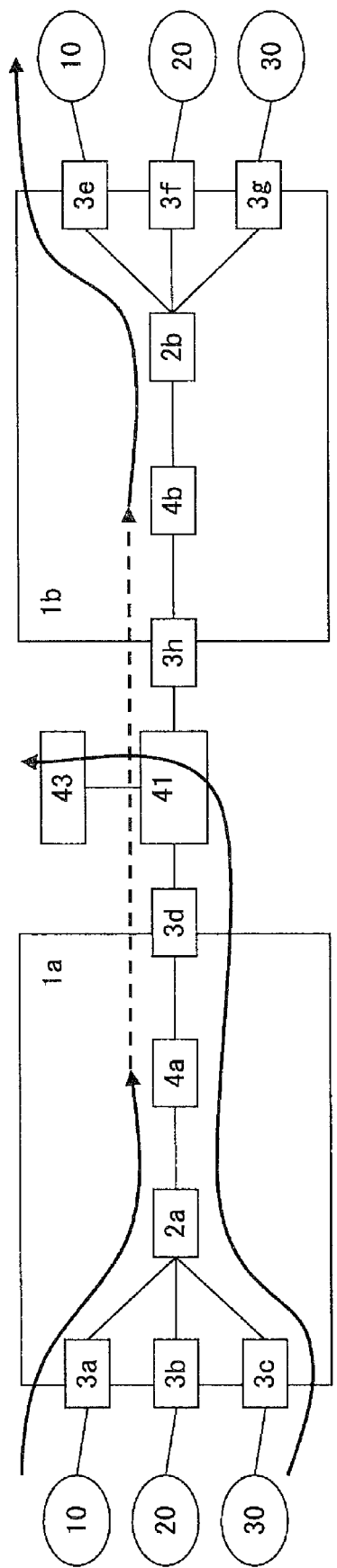
FIG. 3B is an extract of a part of FIG. 3A, showing the apparatuses in detail and the flow of a frame.

FIG. 3A shows an example of the use of the relay apparatus according to the present invention in a VLAN environment. Also, FIG. 3B is an extract of a part of FIG. 3A, showing the apparatuses in detail and the flow of a frame.

FIG. 3A shows a network configuration comprising three VLANs, namely, VLAN 10, 20, and 30.

In FIG. 3A, relay apparatuses 1a and 1b are the same apparatuses as the relay apparatus 1 in FIG. 1 or FIG. 2. In addition, since the relay apparatus 1 of the present invention is a switching apparatus having a function for relaying a frame in Layer 2, the apparatus may be described as "L2SW" in and after FIG. 3A. The relay apparatuses 1a and 1b are respectively connected with terminals (computers) belonging to the VLAN 10, 20, and 30. That is, the relay apparatuses 1a and 1b are edge switches connected with the terminals.

Meanwhile, a core L2/L3 switch 41 that is a conventional relay apparatus (a conventional switching apparatus that has a relay function in Layer 2 or Layer 3 but does not have functions related to the cryptography) is connected with the relay apparatuses 1a and 1b and a firewall 43. That is, the core L2/L3 switch 41 is the core switch relaying between switches. The firewall 43 is connected to a router 44. The router 44 is connected to the Internet 45.

One usage of a VLAN is to overlap a plurality of systems on the same physical network. For instance, in the example of FIG. 3A, apparatuses such as the relay apparatus 1a, core L2/L3 switch 41, relay apparatus 1b, and the cable connecting the apparatuses exist physically. The physical network connected with the physical existences is shared by the three different VLANs, namely the VLAN 10, 20 and 30. That is, a plurality of systems are overlapped on the same physical network.

The plurality of systems sometimes comprise systems that mainly handle secret information and systems that are mainly for Web browsing that does not have to be kept confidential. The former and the latter have different requirements with respect to the secrecy of communications as a matter of course. Accordingly, when using the VLAN, it is not preferable to perform the cryptographic process in units of physical ports, that is, it is not preferable that the cryptographic process is done or not done depending on each physical port (for example, encryption by the cryptographic processing module 4a of all frames transmitted from the relay apparatus 1a to the core L2/L3 switch 41 is not preferable), since this results in performing unnecessary processes to encrypt communications that do not include secret data.

Suppose, for example, that a company has departments A, B, and C. Since departments A and B handle secret data, their communications need to be encrypted and communication with the Internet 45 is banned to maintain secrecy. Also suppose that department C does not handle secret data and mainly sends and receives e-mails and browses the Web (accompanied with communications with the Internet 45). In this case, each of the departments may be separated into a different VLAN, resulting in a configuration like the one in FIG. 3A. That is, department A corresponds to VLAN 10, department B to VLAN 20, and department C to VLAN 30.

According to the present invention, whether or not to perform the encryption can be determined for each VLAN to avoid unnecessary encryption processes. In other words, it is possible to make VLANs 10 and 20 the object of the encryption and to exempt VLAN 30 from the encryption. In addition, as shown in FIG. 3A, the relay apparatuses 1*a* and 1*b* according to the present invention and the core L2/L3 switch 41 that is a conventional relay apparatus can be mixed to configure a network, which is described below.

As extracted and shown in FIG. 3B, the relay apparatus 1*a* is equipped with ports 3*a*-3*d*, and ports 3*a*, 3*b* and 3*c* are assigned to the VLANs 10, 20 and 30, respectively. The assignment is preset by an administrator. Port 3*d* is a port connected to the core L2/L3 switch 41. Inside the relay apparatus 1*a*, port 3*d* is connected to the cryptographic processing module 4*a* by means of an interface such as GMII or MII. Ports 3*a*-3*c* and the cryptographic processing module 4*a* are respectively connected to the frame relay processing unit 2*a* by means of an interface such as GMII or MII.

In the same manner, the relay apparatus 1*b* is equipped with ports 3*e*-3*h*, and port 3*e*, 3*f* and 3*g* are assigned to the VLANs 10, 20 and 30, respectively. Port 3*h* is also connected to the core L2/L3 switch 41.

Meanwhile, in order to simplify the presentation, FIG. 3A shows the cryptographic processing modules 4*a* and 4*b* outside the rectangles representing the relay apparatuses 1*a* and 1*b*. However, the actual configuration is as shown in FIG. 1, FIG. 2 and FIG. 3B, in which the cryptographic processing modules are inside the relay apparatus. The same representation may be used in the figures after FIG. 3A. In addition, some components of the relay apparatuses 1*a* and 1*b*, such as TCG-compliant chips, are omitted in FIG. 3B.

When transmitting a frame from left to right in FIG. 3A within the same VLAN, the frame goes through the relay apparatus 1*a*, the core L2/L3 switch 41, and the relay apparatus 1*b* in any VLAN. Here is a more detailed description with reference to FIG. 3B: In all cases, the frames go through the frame relay processing unit 2*a*, cryptographic processing module 4*a*, port 3*d*, core L2/L3 switch 41, port 3*h*, cryptographic processing module 4*b*, and frame relay processing unit 2*b*. The routes that the frame goes through only differ in each VLAN in the part to the left of the frame relay processing unit 2*a* and in the part to the right of the frame relay processing unit 2*b*.

Also, in FIG. 3A and FIG. 3B, as described above, the terminals belonging to the VLAN 30 are assumed to perform communications with the Internet 45. In FIG. 3A, the communications with the Internet 45 are shown as the two black arrows (an arrow starting from the relay apparatus 1*a*, going through the core L2/L3 switch 41, firewall 43, router 44, to the Internet 45; and an arrow starting from the relay apparatus 1*b*, going through the core L2/L3 switch 41, firewall 43, router 44, to the Internet 45).

Thus, when communicating either within any VLAN or with an external network such as the Internet 45, frames go through the part between port 3*d* and the core L2/L3 switch 41 and/or the part between port 3*h* and the core L2/L3 switch 41. In other words, the physical communication paths (cables) between port 3*d* and the core L2/L3 switch 41 and between port 3*h* and the core L2/L3 switch 41 are shared by a plurality of VLANs. Such communication paths (42*a* and 42*b*) are called ".1Q trunks" after the IEEE 802.1Q that is the standard for the VLAN.

Meanwhile, port 3*a* or the like is assigned to a single VLAN fixedly, whereas port 3*d* and port 3*h* are shared by a plurality of VLANs. Port 3*d* and port 3*h* are called "tagged VLAN ports". The administrator presets port 3*d* and port 3*h* as the tagged VLAN ports. Since a VLAN corresponding to a tagged VLAN port cannot be determined uniquely, frames sent and received between port 3*d* and port 3*h* (more precisely, between frame relay processing unit 2*a* and frame relay processing unit 2*b*) are added with a VLAN-ID that is the information for identifying the VLAN (to be described in more detail later in combination with FIG. 4).

As described above, in the example of FIG. 3A, VLAN 10 and VLAN 20 are the object of the encryption and VLAN 30 is exempted from the encryption. The administrator inputs into the relay apparatus 1*a* the settings as to which VLAN is the object of the encryption. Then, a CPU not shown in FIG. 3B (corresponding to the CPU 6 in FIG. 1) instructs the cryptographic processing module 4*a* to set the input contents. The same process is performed for the relay apparatus 1*b*. As a result, the cryptographic processing modules 4*a* and 4*b* perform cryptographic processing only for the frames requiring the cryptographic process in accordance with the settings input by the administrator.

For instance, when transmitting a frame from left to right in FIG. 3B within the VLAN 10, a frame received in port 3*a* (the frame transmitted from a terminal connected to port 3*a*) is transmitted to the cryptographic processing module 4*a* via the frame relay processing unit 2*a*. The cryptographic processing module 4*a* determines the frame as the object of the encryption and encrypts the frame on the basis of the VLAN-ID contained in the frame and on the settings mentioned above. Then, the encrypted frame is transmitted to the cryptographic processing module 4*b* via port 3*d*, core L2/L3 switch 41, and port 3*h*. The cryptographic processing module 4*b* determines the frame to be the object of decryption on the basis of the VLAN-ID contained in the frame and the settings mentioned above (or, determines the frame to be the object of the decryption on the basis of the fact that the frame contains a cryptographic header 71 described later). Then, the cryptographic processing module 4*b* decrypts the frame. The decrypted frame is transmitted to the frame relay processing unit 2*b* and is relayed to port 3*e*. The frame is further transmitted from port 3*e* to a terminal connected to port 3*e*.

In other words, on the route from the terminal through port 3*a* to the cryptographic processing module 4*a* and on the route from the cryptographic processing module 4*b* through port 3*e* to the terminal, the frame is transmitted in the form of plaintext (also referred to as cleartext). On the other hand, between the cryptographic processing module 4*a* and the cryptographic processing module 4*b*, the frame is transmitted in the encrypted form. The same applies to the case of transmitting a frame within the VLAN 20.

Hereinafter, a frame in the form of plaintext is referred to as a "plaintext frame" and a frame in the encrypted form is referred to as an "encrypted frame." In FIG. 3B, the transmission of a plaintext frame is shown by the solid arrow and the transmission of an encrypted frame is shown by the dashed arrow.

When transmitting a frame from left to right in FIG. 3B in the VLAN 30, the cryptographic processing module 4a determines that the frame is not the object of encryption and that the encryption process is not required for the frame on the basis of the VLAN-ID contained in the frame and on the basis of the settings mentioned above, and transmits the frame to port 3d, keeping the frame in the form of plaintext. Also, the cryptographic processing module 4b determines that the decryption process is not required for the frame because the frame is not the object of encryption and thus is not encrypted on the basis of the VLAN-ID contained in the frame and on the basis of the settings mentioned above (or, determines that the decryption process is not required for the frame on the basis of the fact that the received frame does not contain the cryptographic header 71), and transmits the received plaintext frame to the frame relay processing unit 2b, keeping it in the current form.

When a computer belonging to the VLAN 30 transmits an IP packet to the Internet 45, the frame corresponding to the IP packet goes through port 3d or port 3h. In the relay apparatus 1a, for example, port 3c corresponding to the VLAN 30 is connected to the frame relay processing unit 2a and the frame relay processing unit 2a is connected to the cryptographic processing module 4a, and the cryptographic processing module 4a is connected to port 3d. Therefore, a frame that does not require the cryptographic process also goes through the cryptographic processing module 4a inevitably.

However, when relaying a frame that was received in port 3c, wherein port 3c corresponds to the VLAN 30, to port 3d, the cryptographic processing module 4a determines that the cryptographic process is not required and transmits the plaintext frame to port 3d in the current form in the same manner as when transmitting a frame within the VLAN 30. This corresponds to the fact that, in FIG. 3B, the solid arrow (indicating the transmission of a plaintext frame) goes from the relay apparatus 1a through the core L2/L3 switch 41 to the firewall 43.

As described above, in FIG. 3A, whether or not to determine a frame as the object of the encryption is set to be determined for each VLAN. In other words, the granularity of the encryption is finer in FIG. 3A than in cases such as encrypting all of the frames that go through the .1Q trunk 42a between port 3d and the core L2/L3 switch 41. The finer granularity is an advantage of the present invention since unnecessary encryption of communications that do not include secret data can be avoided.

Thus, since the cryptographic processing modules 4a and 4b can be set to selectively determine whether or not to encrypt a frame for each VLAN, the present invention is capable of interposing the core L2/L3 switch 41, which is a conventional relay apparatus, between relay apparatus 1a and relay apparatus 1b, making it possible to connect the core L2/L3 switch 41 directly to the firewall 43.

If the settings for each VLAN are not possible, a frame has to be encrypted in the cryptographic processing module 4a in FIG. 3A even when a terminal belonging to the VLAN 30 communicates with the Internet 45. Therefore, in order to transmit the encrypted frame outside the firewall 43 after decrypting the frame, the relay apparatus 1 of the present invention needs to be interposed between the core L2/L3 switch 41 and the firewall 43.

In sum, by enabling the settings whether or not to perform cryptographic process for each VLAN, the number of required apparatuses can be reduced. In other words, constraints in configuring a network can be reduced, meaning that the present invention can be applied to a variety of configurations.

Figure 4:
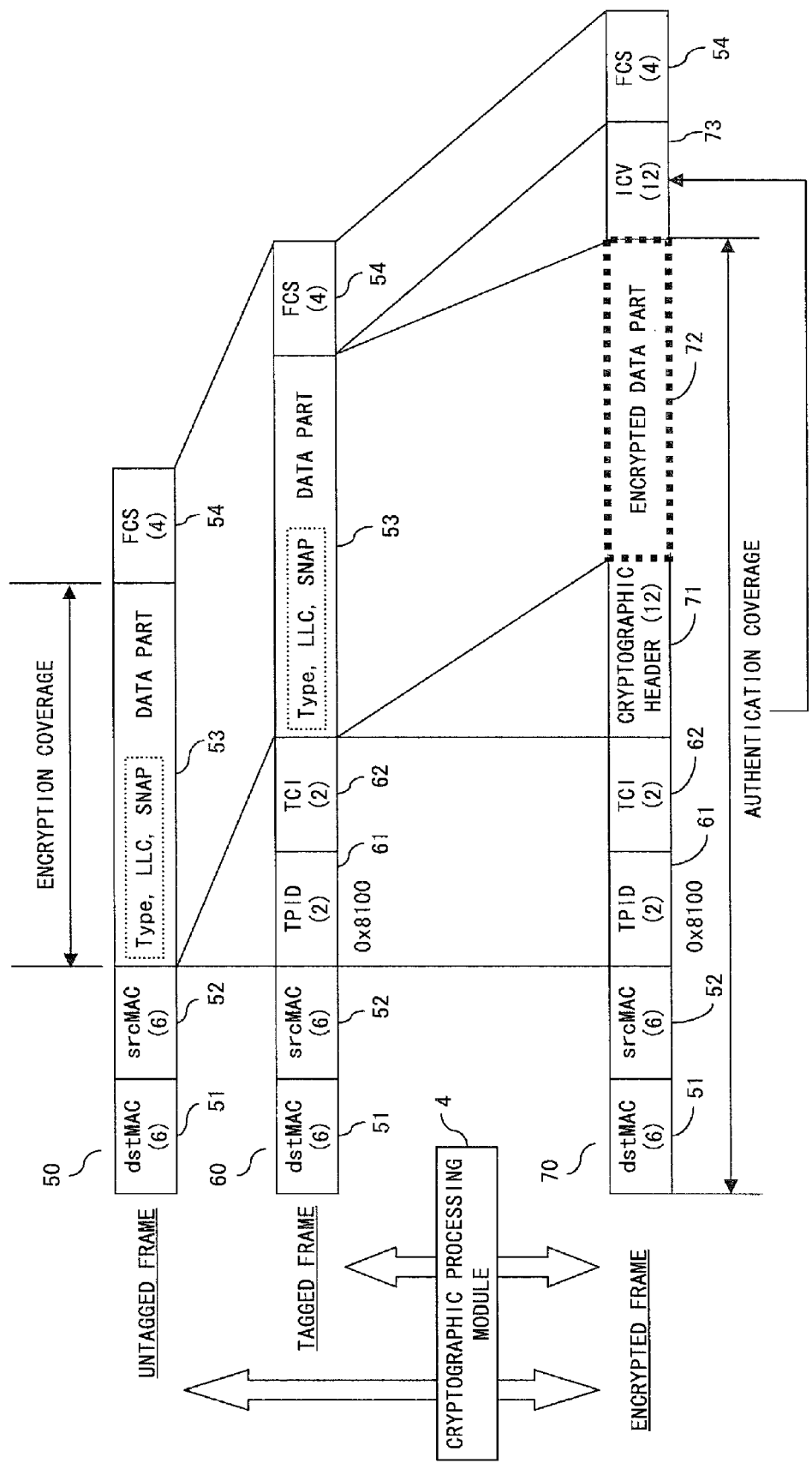
FIG. 4 shows a format of a frame used in the present invention.

FIG. 4 describes the format of a frame used in the present invention. According to the present invention, only the data part in a frame is encrypted.

A frame 50 shown at the top of FIG. 4 is a normal frame sent and received in Layer 2. The frame 50 is composed of a destination MAC address 51 of 6 bytes, a source MAC address 52 of 6 bytes, a data part 53, and an FCS (Frame Check Sequence) 54 of 4 bytes for error detection.

In the case of a MAC frame in DIX Ethernet, the head of the data part 53 is a type represented in 2 bytes, which is followed by data of 46-1500 bytes. Therefore, the frame is 1518 bytes at the maximum (6+6+2+1500+4=1518). In the case of a MAC frame according to the IEEE 802.3 standard, the head of the data part 53 is the length/type represented in 2 bytes, which is followed by, differing by specific frame formats, an LLC header of 3 bytes or a SNAP (Sub Network Access Protocol) header of 5 bytes, followed by data. The data is 46-1500 bytes including the LLC header or SNAP header. Therefore, the maximum length of the frame is 1518 bytes.

A tagged frame 60 shown in the middle level of FIG. 4 is the frame corresponding to the frame 50 inserted with a VLAN tag. The tagged frame 60 is identical to the frame 50 except that a TPID (Tag Protocol Identifier) 61 of 2 bytes and TCI (Tag Control Information) 62 of 2 bytes are inserted between the source MAC address 52 and the data part 53. In Ethernet, the value of the TPID 61 representing a VLAN is 0x8100 (meaning 8100 in hex). The TCI 62 contains a VLAN-ID of 12 bits for identifying a VLAN. Although the TPID 61 and the TCI 62 are sometimes added in a source terminal of the frame, they are generally added in the relay apparatus. In the latter case, the recalculation of the FCS 54 is also performed in the relay apparatus.

In the case of setting whether or not to perform a cryptographic process for each VLAN as in FIG. 3A, the cryptographic processing module 4 judges the necessity of the cryptographic process on the basis of the value of the VLAN-ID contained in the TCI 62.

An encrypted frame 70, shown at the bottom of FIG. 4, is obtained by encrypting the tagged frame 60, which contains a field unique to the present invention. Comparing the encrypted frame 70 to the tagged frame 60, the encrypted frame 70 differs in that the cryptographic header 71 is inserted immediately following the TCI 62, the data part 53 is encrypted to be an encrypted data part 72, and an ICV (Integrity Check Value) 73 is inserted immediately after the encrypted data part 72. The cryptographic header 71 contains information required for decryption (for example, information about a key, which will be described in more detail later). The ICV 73 is a type of a check sum calculated on the basis of the coverage from the destination MAC address 51 to the encrypted data part 72. In addition, when encrypting a frame, the cryptographic processing module 4 also performs the recalculation of the FCS 54.

The first feature of the encrypted frame 70 is that only the data part 53 is encrypted, and the MAC header (the part composed of the destination MAC address 51 and the source MAC address 52) is not encrypted. The second feature is that the cryptographic header 71 is placed posterior to the TCI 62.

The first feature leads to the advantage that the increase in size of the frame or in the complexity of the process can be avoided, as described below.

The method of encrypting a frame including the MAC header has a higher degree of secrecy because the information as to which terminals are engaged in a communication can also be concealed. For example, when transmitting a frame from a terminal Xt connected to a switch Xs that is a relay apparatus to a terminal Yt connected to a switch Ys, the MAC address of the terminal Yt is written on the destination MAC address 51 of the frame and the MAC address of the terminal Xt is written on the source MAC address 52. In the case of encrypting the frame including the MAC header, the frame after the encryption is an encapsulated frame prepended with another MAC header. In other words, in the outer frame, the MAC address of the switch Ys is written as the destination MAC address 51 and the MAC address of the switch Xs is written as the source MAC address 52.

In the encapsulated frame, the information that the terminal Xt and the terminal Yt are engaged in communicating is encrypted, having a high level of secrecy. However, the size of the frame is increased by the size of the added MAC header, which leads to the occurrence of an overhead. In addition, for the encapsulation as described above, the frame relay processing unit in the switch has to determine a switch as the relay destination for each frame and has to add the MAC header according to the determination (in the current example, the switch Xs needs to identify the MAC address of the switch Ys from the MAC address of the destination terminal Yt). Thus, the relay processing is complicated.

By contrast, in the encrypted frame 70 of the present invention, the destination MAC address 51 and the source MAC address 52 are not encrypted, offering slightly less secrecy than the above-described method. However, since there is no need to add another MAC header to the frame, the size of the frame can be smaller than the above-described method.

Also, the frame relay processing unit 2 is only required to perform the normal relay process (for example, it is not required to identify the MAC address of the switch Ys from the MAC address of the destination terminal Yt). Therefore, as shown in FIG. 1 and FIG. 2, the present invention can utilize a frame relay processing unit 2 similar to the conventional switch apparatus that does not perform the cryptographic process. Then, the function relating to the encryption/decryption can be off-loaded to the cryptographic processing modules (4a, etc.) disposed corresponding to the respective ports as needed.

Next, the second feature in which the cryptographic header 71 is placed posterior to the TCI 62 is described below. The second feature leads to the advantage that the relay apparatus 1 of the present invention and a normal Layer 2 relay apparatus without the cryptographic processing function can be mixed to configure a network.

In the aforementioned conventional third method for encrypting the Ethernet communications, a system that inserts a header for encryption immediately following the MAC header (that is, immediately following the source MAC address 52) has been considered. In this system, the VLAN to which the original tagged frame 60 before encryption belongs cannot be determined unless the encrypted frame is decrypted because the TCI 62 that is the information required for the determination is placed after the inserted header in the encrypted form. For this reason, if the normal Layer 2 relay apparatus without the cryptographic processing function is mixed into the communication paths in the network, the normal Layer 2 relay apparatus cannot determine which VLAN the frame corresponds to, and cannot relay the frame appropriately. Accordingly, when adopting the aforementioned third method, the normal Layer 2 relay apparatus without the cryptographic processing function cannot be mixed.

In contrast, in the encrypted frame 70 of the present invention, the cryptographic header 71 and the encrypted data part 72 are placed following the TPID 61 and TCI 62 in the form of plaintext. Therefore, the normal Layer 2 relay apparatus without the cryptographic processing function can also determine which VLAN the frame corresponds to, and can relay the frame appropriately. In this case, the normal Layer 2 relay apparatus recognizes the encrypted frame 70 simply as a tagged frame. Therefore, according to the present invention, the normal Layer 2 relay apparatus can be mixed to configure a network, efficiently utilizing the existing apparatus. In addition, the relay apparatus 1 of the present invention can be utilized in various network configurations.

Meanwhile, focusing attention on the fact that the frame relay processing unit 2 in the relay apparatus 1 of the present invention shown in FIG. 1 and FIG. 2 does not have the cryptographic processing function either, the second feature leads to the following advantage. That is, the frame relay processing unit 2 recognizes the encrypted frame 70 in FIG. 4 as same as the mere tagged frame 60 and can perform the relay process without any consideration of the encryption. In other words, the frame relay processing unit 2 is only required to perform the identical process as the frame relay processing unit in the conventional Layer 2 relay apparatus without the cryptographic processing function. Also, as shown in FIG. 2, there is no need to equip all ports with the cryptographic processing modules.

Meanwhile, in an environment not using the VLAN, the encryption is performed not for the tagged frame 60 but for the frame 50. Therefore, the encrypted frame in this case is in the form corresponding to the encrypted frame 70 in FIG. 4 with the TPID 61 and TCI 62 removed.

Figure 5:
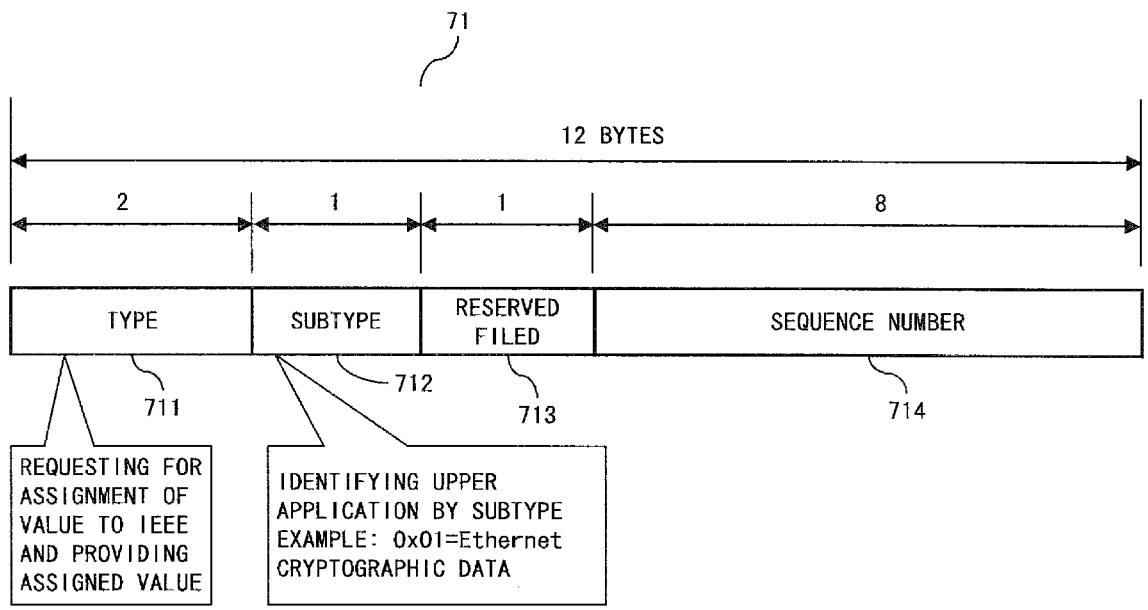
FIG. 5 shows a cryptographic header in detail.

FIG. 5 shows details of the cryptographic header 71. The length of the cryptographic header 71 is 12 bytes, as shown in FIG. 4. As shown in FIG. 5, the cryptographic header 71 is composed of a type 711 of 2 bytes, a subtype 712 of 1 byte, a reserved field 713 of 1 byte, and a sequence number 714 of 8 bytes.

The type 711 is the field storing a global unique value representing the type of the frame. In order to give the type 711 a global unique value, a request for the assignment of a value to the IEEE and the assignment of the value by the IEEE are necessary. The reason that the type 711 has to be a global unique value is as follows.

As is apparent from FIG. 4 and FIG. 5, in the environment using the VLAN, the type 711 is placed immediately following the TCI 62, and in the environment not using the VLAN, the type 711 is placed immediately following the source MAC address 52. Therefore, the type (placed at the head of the data part 53) in the frame 50 or in the tagged frame 60 is in the same position as the type 711 in the encrypted frame 70. Accordingly, it is necessary to determine the presence or absence of the cryptographic header 71 on the basis of the value of the type 711.

The type placed at the head of the data part 53 in the frame 50 and the tagged frame 60 is a global unique value for identifying a protocol used by the upper layer, that is, Layer 3. For example, 0x0800 represents the IP. When the value of the type is 0x0800, the data part 53 is the data in accordance with the IP format.

Therefore, the assignment of a specific global unique value (assumed as Z) to the type 711 enables the determination of the presence or absence of the cryptographic header 71. That is, in the environment using the VLAN, if the value of 2 bytes immediately following the TCI 62 is Z, the presence of the cryptographic header 71 can be determined, and in the environment not using the VLAN, if the value of 2 bytes immediately following the source MAC address 52 is Z, the presence of the cryptographic header 71 can be determined.

By thus enabling the determination of the presence or absence of the cryptographic header 71, it is also made possible to determine, for example, whether a frame received in the cryptographic processing module 4b from port 3h in FIG. 3B is an encrypted frame or a plaintext frame on the basis of the presence or absence of the cryptographic header 71.

The subtype 712 is the field for utilizing the single value assigned by the IEEE (Z mentioned above) for various purposes. The type 711 and subtype 712 are only required to indicate what the data in the upper layer represents, and their values themselves do not mean anything. For example, it is possible to define as "when the type 711 is Z and the value of the subtype 712 is 0x01, an encrypted Ethernet communication is conducted, and it represents the fact that the cryptographic header 71 is followed by the encrypted data part 72."

The reserved field 713 consists of 1 byte reserved for future use. A usage example is described later in combination with FIG. 11.

The sequence number 714 is the field storing the number that increases by 1 every time the cryptographic processing module 4 encrypts and transmits a frame (this operation of the cryptographic processing module 4 is described later in combination with FIG. 9). Since the field length of the sequence number 714 is 8 bytes, i.e., 64 bits, $2^{64}$ numbers are available. Therefore, even with high-speed lines such as 1 Gbps or 10 Gbps, it takes a considerable amount of time for the same sequence number to be used.

For example, when a cryptographic processing module encrypts 1 G frames per second, it takes $2^{64}/10^9 = 1.84 \times 10^{10}$ seconds$\cong$585 years to return to the same sequence number. Therefore, the sequence number 714 can be regarded as essentially unique.

However, it is possible for two or more cryptographic processing modules 4 to accidentally use the same value. Given this possibility, it is desirable to set the initial value of the sequence number randomly in each cryptographic processing module 4 to reduce the odds of two or more cryptographic processing modules using the same value accidentally.

FIGS. 6A to 8B show configuration examples of networks using the relay apparatus 1 according to the present invention. The relay apparatus 1 according to the present invention has different variations in regard to which port is equipped with the cryptographic processing module (4a, etc.), which depends on the embodiment, as shown in FIG. 1 and FIG. 2. Furthermore, each cryptographic processing module is different, depending on the embodiments, in regard to whether it performs the encryption process or decryption process according to the direction of a frame transmission.

The price of the relay apparatus 1 and how to configure a network to realize the cryptographic communication in Layer 2 differ depending on the combination of the above variations. In other words, the present invention is highly flexible, as it can be implemented in various configurations according to the convenience of users.

Figure 6B:
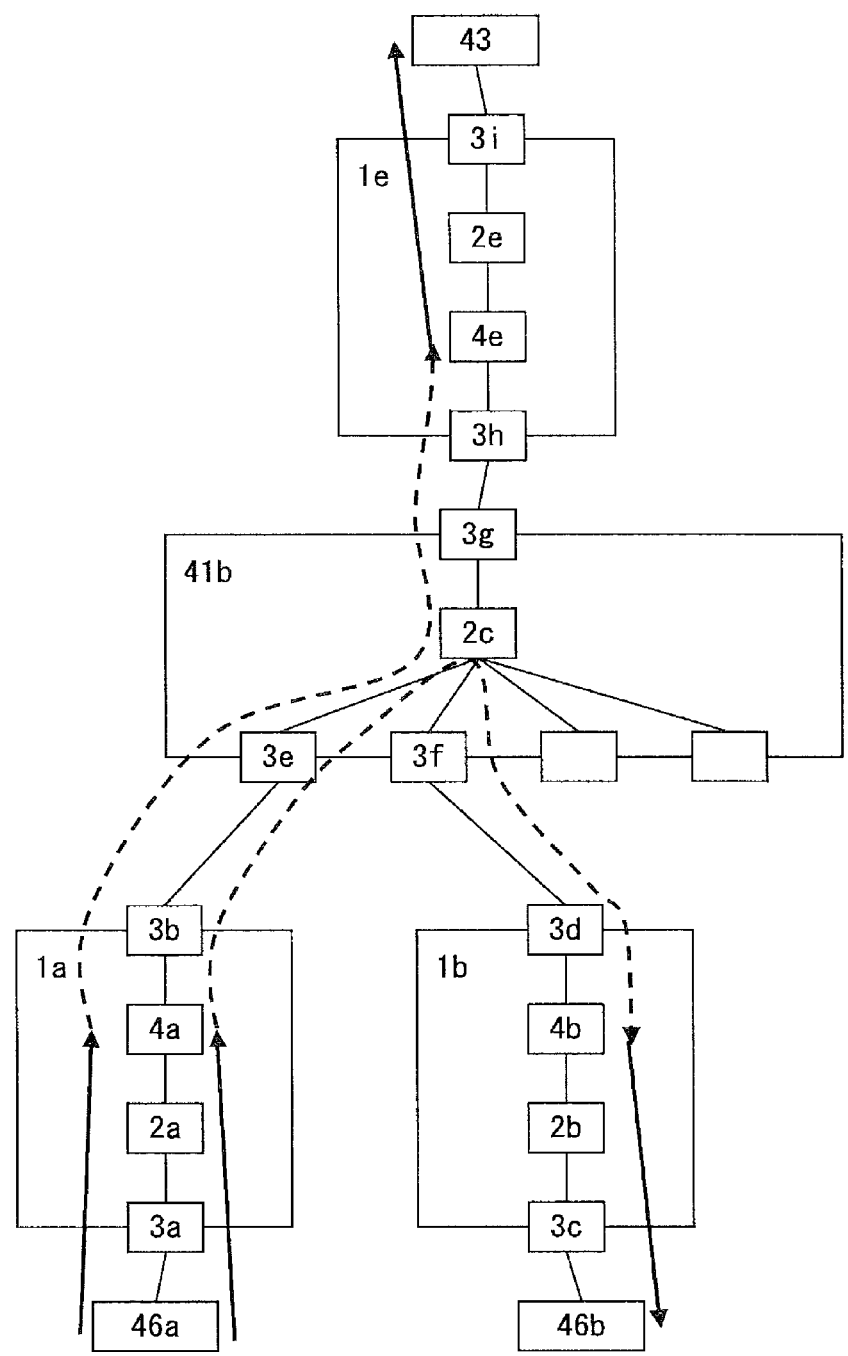
FIG. 6B is an extract of a part of FIG. 6A, showing the apparatuses in detail and the flow of a frame.

The network configuration of FIG. 6A only uses inexpensive relay apparatuses 1a-1e in which only one port is equipped with the cryptographic processing module and a conventional L2 switch 41b. FIG. 6B is an extract of a part of FIG. 6A, showing the apparatuses in detail and the flow of a frame. In FIG. 6B, components such as the TCG-compliant chip and the like are omitted in the same manner as in FIG. 3B.

In FIG. 6A, four PCs (Personal Computers) 46a-46d are respectively connected to relay apparatuses 1a-1d of the present invention. The relay apparatuses 1a-1d are all connected to the conventional L2 switch 41b that does not perform the cryptographic process. The L2 switch 41b is connected to relay apparatus 1e of the present invention. That is, while the topology of FIG. 6A is very similar to the one-to-N star switch topology in the physical sense of the wiring of cables, in the logical sense of the pair conducting encrypted communications, the topology is N-to-N. In other words, since the encrypted communications are conducted between combinations such as the pair of relay apparatuses 1a and 1b, the pair of relay apparatuses 1a and 1c, the pair of relay apparatuses 1a and 1d, the pair of relay apparatuses 1b and 1c, the pair of relay apparatuses 1b and 1d, . . . and so on, the relationship is N-to-N.

The relay apparatuses 1a-1d are each equipped with cryptographic processing modules 4a-4d corresponding to the ports connected to the L2 switch 41b. The other ports are not equipped with the cryptographic processing module. The relay apparatus 1e is equipped with a cryptographic processing module 4e corresponding to the port connected to the L2 switch 41b, and the other ports of the relay apparatus 1e are not equipped with the cryptographic processing module. The relay apparatus 1e is also connected to the firewall 43, and the firewall 43 is connected to the router 44. Communications with an external network such as the Internet 45 are conducted via the router 44.

The relay apparatuses 1a-1e in FIG. 6A can be produced inexpensively since the cryptographic processing module is provided only for one port in each of them. In addition, the cryptographic processing modules 4a-4e all encrypt a frame when transmitting it to the corresponding port and decrypt a frame when receiving it from the corresponding port. For example, as shown in FIG. 6B, port 3b corresponds to the cryptographic processing module 4a. The cryptographic processing module 4a encrypts a frame when receiving it from the frame relay processing unit 2a and transmitting it to port 3b, and decrypts a frame when receiving it from port 3b and transmitting it to the frame relay processing unit 2a.

Next, the transmitting of a frame from PC 46a to PC 46b is described with reference to FIG. 6B. The relay apparatus 1a is connected to PC 46a via port 3a, and to the L2 switch 41b via port 3b. First, when PC 46a transmits the frame 50 (plaintext frame) shown in FIG. 4, the frame 50 is received at port 3a and the frame relay processing unit 2a relays the frame to port 3b equipped with the cryptographic processing module 4a. At that time, the frame 50 goes through the cryptographic processing module 4a and is encrypted there.

Since the VLAN is not used in the example of FIG. 6A, the encrypted frame is in the form corresponding to the encrypted frame 70 shown in FIG. 4 with the TPID 61 and TCI 62 removed. The encrypted frame is transmitted from port 3b in the relay apparatus 1a to port 3e in the L2 switch 41b.

When the L2 switch 41b receives the encrypted frame at port 3e, the encrypted frame is transmitted to the frame relay processing unit 2c, which relays the encrypted frame to port 3f connected to the relay apparatus 1b. The MAC header of the encrypted frame is not encrypted as described in relation to FIG. 4. Therefore, the frame relay processing unit 2c in the L2 switch 41b recognizes the encrypted frame as a normal frame and can perform the relay process. The encrypted frame transmitted to port 3f is transmitted from port 3f to the relay apparatus 1b. That is, the encrypted frame is subject to no cryptographic process while it goes through the L2 switch 41b.

The relay apparatus 1b receives the encrypted frame at port 3d equipped with the cryptographic processing module 4b. The cryptographic processing module 4b is disposed between port 3d and the frame relay processing unit 2b and decrypts the encrypted frame. The decrypted frame is transmitted to the frame relay processing unit 2b, relayed to port 3c connected to PC 46b, and transmitted from port 3c to PC 46c.

The frame is transmitted from PC 46a to PC 46b as described above to realize the encrypted communication. In FIG. 6B, solid arrows correspond to plaintext frames and dashed arrows correspond to encrypted frames in the same manner as in FIG. 3B. In addition, FIG. 6A indicates, with halftone dot meshing, the area in which the cryptographic communication is conducted.

Next, the case of transmitting an IP packet from PC 46a to the Internet 45 in FIG. 6A and FIG. 6B is described. A frame corresponding to the IP packet is transmitted from PC 46a through the relay apparatus 1a and the L2 switch 41b to the relay apparatus 1e.

The route from PC 46a to L2 switch 41b is identical to that in the above example. After this route is completed, the encrypted frame received at port 3e in the L2 switch 41b is relayed by the frame relay processing unit 2c to port 3g connected to the relay apparatus 1e. Then, the encrypted frame is transmitted from port 3g to the relay apparatus 1e.

As shown in FIG. 6B, the relay apparatus 1e comprises port 3h connected to the L2 switch 41b, the cryptographic processing module 4e connected to port 3h, and port 3i connected to the firewall 43. The relay apparatus 1e further comprises the frame relay processing unit 2e connected to the cryptographic processing module 4e and port 3i. The relay apparatus 1e receives at port 3h an encrypted frame transmitted from port 3g in the L2 switch 41b. The encrypted frame is decrypted in the cryptographic processing module 4e connected to port 3h, transmitted to the frame relay processing unit 2e, and relayed to port 3i. The decrypted plaintext frame is then transmitted from port 3i to the firewall 43.

According to the configuration shown in FIG. 6A and FIG. 6B, the communications in the Ethernet can be encrypted. Also, since port 3i transmits the decrypted plaintext frame, there is no need to modify the configurations of the existing firewall 43 and router 44.

The cryptographic processing modules 4a-4e in FIG. 6A and FIG. 6B are assumed to have the configuration for inevitably conducting either the encryption process or the decryption process. On the other hand, the cryptographic processing modules 4a and 4b in FIG. 3A and FIG. 3B are configured to determine the necessity of the cryptographic process and to perform no process for the frame corresponding to the VLAN 30. Although the present invention can be implemented according to any of the above-mentioned configurations, the embodiment without the determination of the necessity of the cryptographic process simplifies and speeds up the process and can be easily realized as hardware.

If the cryptographic processing modules 4a-4d are configured to determine the necessity of the cryptographic process in FIG. 6A and FIG. 6B, the relay apparatus 1e is not needed since communications with the Internet 45 do not require the decryption process in the cryptographic processing module 4e. However, if a VLAN is not used in that case, an operation is required such as the determination of the necessity of the cryptographic process by the cryptographic processing module 4a or the like on the basis of the destination MAC address 51.

Figure 7A:
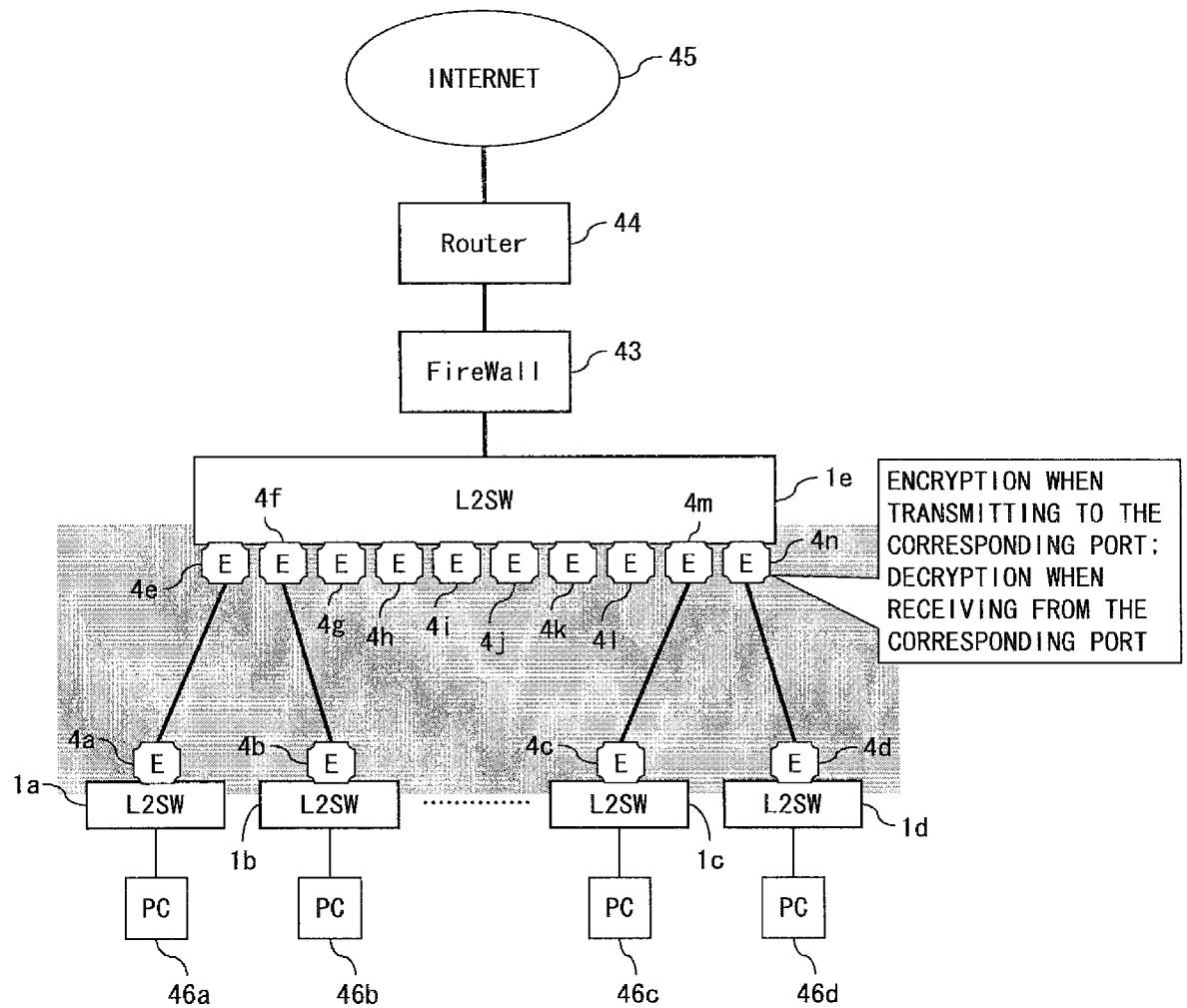
FIG. 7A shows a configuration example of a network using the relay apparatus according to the present invention.
Figure 7B:
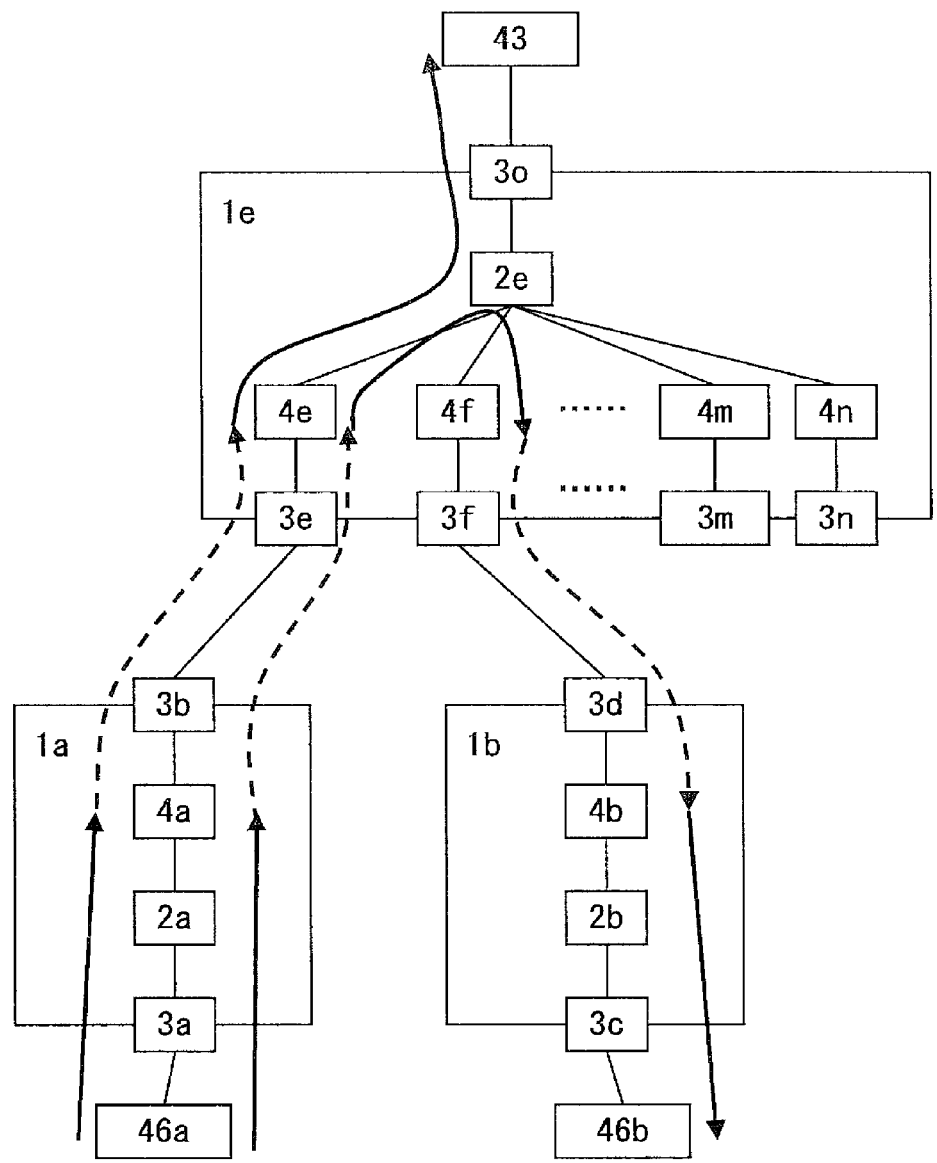
FIG. 7B is an extract of a part of FIG. 7A, showing the apparatuses in detail and the flow of a frame.

The network configuration in FIG. 7A uses the inexpensive relay apparatuses 1a-1d equipped with the cryptographic processing module only for one port, and the expensive relay apparatus 1e equipped with the cryptographic processing modules for a plurality of ports. FIG. 7B is an extract of a part of FIG. 7A, showing the apparatuses in detail and the flow of a frame. In FIG. 7B, components such as the TCG-compliant chip and the like are omitted in the same manner as in FIG. 3B.

The significant difference between FIG. 6A and FIG. 7A is that the L2 switch 41b required in FIG. 6A is not needed in FIG. 7A. Instead, the expensive relay apparatus 1e equipped with the cryptographic processing modules for a plurality of ports is required in FIG. 7A.

The network configuration of FIG. 7A is one-to-N star switch topology in the physical sense of the wiring of cables, as in FIG. 6A, but in the logical sense of the pair conducting encrypted communications, it is the N-to-N topology.

In FIG. 7A, the four PCs 46a-46d are respectively connected to the relay apparatuses 1a-1d of the present invention. The relay apparatuses 1a-1d are all connected to the relay apparatus 1e of the present invention. The relay apparatuses 1a-1d are each equipped with the cryptographic processing modules 4a-4d corresponding to the ports connected to the relay apparatus 1e. The other ports are not equipped with the cryptographic processing module. Relay apparatus 1e is equipped with cryptographic processing modules for a plurality of ports. Specifically, as shown in FIG. 7B, the cryptographic processing modules 4e-4n are respectively provided in correspondence with ports 3e-3n connected to the relay apparatuses 1a-1d. Relay apparatus 1e is also connected to the firewall 43, and the firewall 43 is connected to the router 44. Communications with an external network such as the Internet 45 are conducted via the router 44.

The cryptographic processing modules 4a-4n in FIG. 7A all encrypt a frame when transmitting it to the corresponding port and decrypt a frame when receiving it from the corresponding port.

For example, the case of transmitting a frame from PC 46a to PC 46b is described in reference to FIG. 7B. The relay apparatus 1a in FIG. 7B has the same configuration as the relay apparatus 1a in FIG. 6B. First, the frame 50 shown in FIG. 4 is transmitted from PC 46a. The frame 50 is received in relay apparatus 1a at port 3a connected to PC 46a. Then, the frame relay processing unit 2a in the relay apparatus 1a relays the frame to port 3b equipped with the cryptographic processing module 4a. At that time, the frame 50 goes through the cryptographic processing module 4a and is encrypted there. The encrypted frame is transmitted from port 3b in relay apparatus 1a to port 3e in relay apparatus 1e.

When relay apparatus 1e receives the encrypted frame at port 3e, the cryptographic processing module 4e, which is connected to port 3e, decrypts the frame and transmits it to the frame relay processing unit 2e. The frame relay processing unit 2e relays the received frame to port 3f. At that time, the frame goes through the cryptographic processing module 4f connected to port 3f and is encrypted again by the cryptographic processing module 4f. The encrypted frame is transmitted from the cryptographic processing module 4f to port 3f and is transmitted from port 3f to relay apparatus 1b.

Relay apparatus 1b receives the encrypted frame at port 3d equipped with the cryptographic processing module 4b. The cryptographic processing module 4b is disposed between port 3d and the frame relay processing unit 2b and decrypts the frame. The decrypted frame is transmitted to the frame relay processing unit 2b, relayed to port 3c connected to PC 46b, and transmitted from port 3c to PC 46c.

The frame is transmitted from PC 46a to PC 46b as described above to realize the encrypted communication. In addition, in FIG. 7B, a plaintext frame corresponds to the solid arrow and an encrypted frame corresponds to the dashed arrow in the same manner as in FIG. 3B. Also, FIG. 7A indicates, with halftone dot meshing, the area in which the cryptographic communication is conducted, as in FIG. 6A.

Next, the case of transmitting an IP packet from PC 46*a* to the Internet 45 in FIG. 7A is described with reference to FIG. 7B. A frame corresponding to the IP packet is transmitted from PC 46*a* through relay apparatus 1*a* to relay apparatus 1*e*.

The route from PC 46*a* to relay apparatus 1*e* is identical to that in the example described above. After this route is completed, the encrypted frame received at port 3*e* in the relay apparatus 1*e* is decrypted in the cryptographic processing module 4*e* and transmitted to the frame relay processing unit 2*e*, and relayed to port 3*o* connected to the firewall 43. The frame is transmitted from port 3*o* to the firewall 43.

According to the configuration shown in FIG. 7A and FIG. 7B, although an expensive apparatus such as relay apparatus 1*e* is required, the network can be configured with fewer apparatuses than in FIG. 6A, and the communications in the Ethernet can be encrypted. Also, since port 3*o* transmits the decrypted plaintext frame, there is no need to modify the configurations of the existing firewall 43 and router 44.

The network configuration in FIG. 8A uses only inexpensive relay apparatuses 1*a*-1*e* equipped with the cryptographic processing module for only one port. FIG. 8A is identical with FIG. 7A except that the specific configuration of relay apparatus 1*e* is different from that of relay apparatus 1*e* in FIG. 7A. FIG. 8B is an extract of a part of FIG. 8A, showing the apparatuses in detail and the flow of a frame. In FIG. 8B, components such as the TCG-compliant chip and the like are omitted in the same manner as in FIG. 3B.

The network configuration in FIG. 8A has the advantage that the number of apparatuses is reduced by one (the L2 switch 41*b* is not needed) compared to that in FIG. 6A and that it can be configured with only inexpensive apparatuses, unlike that in FIG. 7A (relay apparatus 1*e* in FIG. 7A is expensive, whereas relay apparatus 1*e* in FIG. 8A is inexpensive). The basis for enabling such a configuration is the use of the cryptographic processing module 4*e* that decrypts a frame when transmitting it to the corresponding port and encrypts a frame when receiving it from the corresponding port, inversely to the cases of FIG. 6A and FIG. 7A.

For example, the transmission of a frame from PC 46*a* to PC 46*b* is described in reference to FIG. 8B. The frame 50 is transmitted from PC 46*a*, encrypted in the cryptographic processing module 4*a* in the relay apparatus 1*a*, and transmitted from port 3*b* connected to the cryptographic processing module 4*a* to the relay apparatus 1*e* in the same manner as in FIG. 7B.

The encrypted frame is received at port 3*e* in the relay apparatus 1*e* connected to port 3*b*. The relay apparatus 1*e* comprises the frame relay processing unit 2*c* and port 3*e* is connected to the frame relay processing unit 2*c*. The relay apparatus 1*e* also comprises port 3*f* connected to the relay apparatus 1*b* and port 3*f* is also connected to the frame relay processing unit 2*c*. Therefore, the encrypted frame received at port 3*e* is transmitted to the frame relay processing unit 2*c* and relayed to port 3*f* according to the destination MAC address 51 while being kept in the encrypted form. The frame is then transmitted from port 3*f* to relay apparatus 1*b*.

The relay apparatus 1*b* receives the encrypted frame at port 3*d* and the cryptographic processing module 4*b*, which is connected to port 3*d*, decrypts the encrypted frame. The decrypted frame is transmitted from the cryptographic processing module 4*b* to the frame relay processing unit 2*b*, relayed to port 3*c*, and transmitted to PC 46*b* connected to port 3*c*.

The frame is transmitted from PC 46*a* to PC 46*b* as described above to realize the encrypted communication. In addition, in FIG. 8B as in FIG. 3B etc., a plaintext frame corresponds to the solid arrow and an encrypted frame corresponds to the dashed arrow. Also, FIG. 8A indicates, with halftone dot meshing, the area in which the cryptographic communication is conducted. The difference between FIG. 8B and FIG. 7B is that in FIG. 8B, the relay apparatus 1*e* performs no cryptographic process when transmitting the frame from PC 46*a* to PC 46*b*.

Next, the transmission of an IP packet from PC 46*a* to the Internet 45 in FIG. 8A is described with reference to FIG. 8B. A frame corresponding to the IP packet is transmitted from PC 46*a* through the relay apparatus 1*a* to the relay apparatus 1*e*.

The route from PC 46*a* to the relay apparatus 1*e* is identical to the route in the example described above. After that, the encrypted frame received at port 3*e* in the relay apparatus 1*e* is transmitted to the frame relay processing unit 2*c* while being kept in the encrypted form. Relay apparatus 1*e* comprises port 3*g* connected to the firewall 43. Port 3*g* is connected to the cryptographic processing module 4*e*, and the cryptographic processing module 4*e* is connected to the frame relay processing unit 2*c*. Therefore, the frame relay processing unit 2*c* relays the encrypted frame to port 3*g*. At that time, the frame goes through the cryptographic processing module 4*e*, is decrypted in the cryptographic processing module 4*e*, and is transmitted to port 3*g*. The frame is then transmitted from port 3*g* to the firewall 43.

According to the configuration shown in FIG. 8A and FIG. 8B, the network can only be configured with fewer apparatuses than in FIG. 6A and only with less expensive apparatuses than in FIG. 7A, and the communications in the Ethernet can be encrypted. Since the configuration in FIG. 8A contains fewer apparatuses than in FIG. 6A, it not only has an excellent cost performance but also has a low incidence of failure. This is because a failure of the L2 switch 41*b* causes a failure of the entire Ethernet in FIG. 6A, whereas the L2 switch 41*b* does not exist in FIG. 8A. Also, since port 3*g* transmits the decrypted plaintext frame, there is no need to modify the configurations of the existing firewall 43 and router 44.

As thus described, there are two types of cryptographic processing modules relating to whether it performs the encryption process or decryption process depending on a direction of the flow of the frame. Namely, the two types include one that encrypts a frame when transmitting it to the corresponding port and decrypts a frame when receiving it from the corresponding port (for example, the cryptographic processing modules 4*a* and 4*b* in FIG. 8B), and one that decrypts a frame when transmitting it to the corresponding port and encrypts a frame when receiving it from the corresponding port (for example, the cryptographic processing module 4*e* in FIG. 8B).

Which type of operation the individual cryptographic processing module performs can be arbitrarily selected. For example, an administrator may input the settings to the relay apparatus 1 and the CPU 6 may set the contents of the input for the individual cryptographic processing module 4. The two types of operations are thus selectable, which enables a user to select an appropriate configuration from various configurations described in combination with FIGS. 6A-8B, depending on the individual embodiment.

Figure 9:
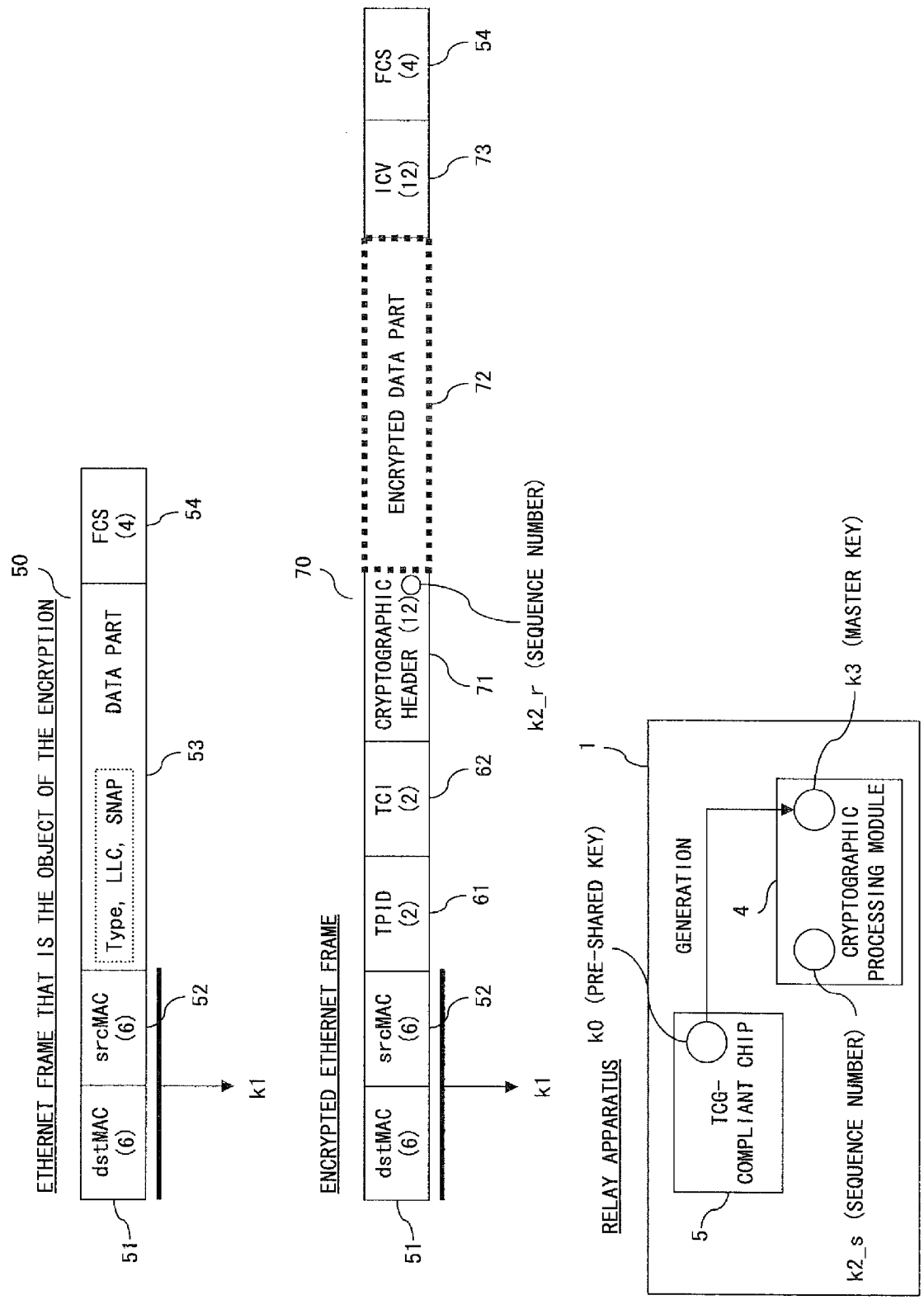
FIG. 9 shows a key used for the cryptographic process in the present invention.

FIG. 9 describes a key used for the cryptographic process in the present invention. The present invention uses secret-key (also called symmetric-key) cryptography for the cryptographic process (the encryption and decryption). One feature of the present invention is how to generate a cryptographic key.

Generally, in the cryptographic algorithm of the secret-key system, a cryptographic key needs to be shared between an apparatus performing the encryption and an apparatus performing the decryption. Moreover, repeated use of the same cryptographic key increases the odds of the cryptography being broken (deciphered) on the basis of an intercepted ciphertext. Therefore, for stronger security, replacement of the cryptographic key with a new one is required on a regular basis. For that purpose, it is generally required that key information be dynamically exchanged between apparatuses conducting cryptographic communications in accordance with a predetermined protocol to generate the new secret key from the key information.

However, the method of dynamically exchanging key information in order to share the cryptographic key has disadvantages. First, the protocol for the exchange of key information is complicated, which easily causes trouble when exchanging the key information or when a failure occurs in an apparatus. Implementation in the case of conducting encrypted communications in the N-to-N relationship is particularly complicated. Second, conducting cryptographic communications with each of a large number of apparatuses increases the load of the process for exchanging key information, putting constraints on the scalability.

According to the present invention, there is no need for dynamically exchanging key information, and different cryptographic keys can be generated for each frame with a simple configuration. A strong security and scalability are attained at the same time, and high-speed processing can be realized accordingly. The specific method for achieving that purpose is described below.

In FIG. 9, three types of information are used for generating a cryptographic key. First, the definitions of terms are provided in (d1)-(d5).

(d1) A "frame key" is a cryptographic key used for the encryption and decryption of a frame, which is a secret key shared between the relay apparatus 1 performing the encryption and the relay apparatus 1 performing the decryption. Hereinafter, the frame key is represented by the symbol "k."

(d2) A "pre-shared key" is data being set for the relay apparatus 1 by an administrator or the like. The pre-shared key may be, for example, a password consisting of eight or less alphanumeric characters. Hereinafter, the pre-shared key is represented by the symbol "k0."

(d3) "MAC header information" is information based on, at minimum, either the destination MAC address 51 or the source MAC address 52 of a plaintext frame (the frame 50 or tagged frame 60) being the object of the encryption. In the embodiments described below, the MAC header information is the information including both the destination MAC address 51 and the source MAC address 52. Hereinafter, the MAC header information is represented by the symbol "k1."

(d4) A "sequence number" is a number managed in each cryptographic processing module 4 performing the encryption, and this number increases by one with each encryption process. The sequence number is also written into an encrypted frame. The date length of the sequence number is 8 bytes in the example in FIG. 5 and in the embodiments described below. Hereinafter, the sequence number is represented by the symbol "k2." In addition, the sequence number managed in the cryptographic processing module 4 may be represented by the symbol "k2_s" and a sequence number such as the sequence number 714 in FIG. 5 that is written into an encrypted frame may be represented by the symbol "k2_r" in order to distinguish between the two.

(d5) A "master key" is data generated by the cryptographic processing module 4 on the basis of the pre-shared key k0. It is desirable for the master key to have a longer data length than the pre-shared key k0. Hereinafter, the master key is represented by the symbol "k3."

In the embodiments described below, three types of information, namely the MAC header information k1, the sequence number k2, and the master key k3 are used for generating the frame key k.

FIG. 9 shows a part of the same relay apparatus 1 that is in FIG. 1 and FIG. 2, extracting only the part relating to the generation of the frame key k.

The pre-shared key k0 is set by an administrator in advance and stored in the TCG-compliant chip 5. Therefore, it is impossible to fraudulently read the pre-shared key k0 from outside.

In an embodiment, the same value is set as the pre-shared key k0 in all the relay apparatuses 1 of the present invention included in the area in which encrypted communications are conducted. For instance, in the example of FIG. 3A, the pre-shared key k0 of the same value is set in both of the relay apparatuses 1a and 1b, and in the example of FIG. 8A, the pre-shared key k0 of the same value is set in all of the relay apparatuses 1a-1e.

In another embodiment using VLANs, different pre-shared keys may be set for each of the VLANs. For example, in the example of FIG. 3A, both of the pre-shared key k0 for the VLAN 10 and the pre-shared key k0' for the VLAN 20 may be set in both of the relay apparatuses 1a and 1b. Even in this case, it is still the same as in the above embodiment that the same values are set in both of the relay apparatuses 1a and 1b.

The MAC header information k1 is the information that can be read from the frame 50 being the object of the encryption. Meanwhile, the object of the encryption in a VLAN environment is the tagged frame 60 shown in FIG. 4. In that case, the MAC header information k1 can also be read from the tagged frame 60.

The sequence number k2_s is stored, for example, in a counter inside the cryptographic processing module 4. The cryptographic processing module 4 increases the value of the counter by one with each encryption of a frame. It is preferable that a different initial value of the counter, as described above, be randomly set in each cryptographic processing module 4. The value indicated by the counter is the sequence number k2_s. The cryptographic processing module 4 places the sequence number k2_s as the sequence number k2_r in the part corresponding to the cryptographic header 71 in the encrypted frame 70 (the sequence number k2_r corresponds to the sequence number 714 in FIG. 5).

The master key k3 is generated by the cryptographic processing module 4 on the basis of the pre-shared key k0. When the administrator sets the pre-shared key k0 in the relay apparatus 1, the CPU 6 instructs the cryptographic processing module 4 to generate the master key k3, and the cryptographic processing module 4 generates the master key k3 according to the instruction. The generated master key k3 is stored inside the cryptographic processing module 4. Alternatively, the cryptographic processing module 4 may generate, on the basis of the pre-shared key k0, a master key array ka that is the array of candidate values from which the master key k3 is generated. In this case, the master key array ka is stored inside the cryptographic processing module 4, and the master key k3 is selected from the stored master key array ka (to be described in more detail later). Either way, the master key k3 is generated on the basis of the pre-shared key k0.

There are several methods for generating the master key k3 from the pre-shared key k0, as described later. As described above, the pre-shared key k0 has the same value in all of the relay apparatuses 1 of the present invention included within the area in which the encrypted communications are conducted. Also, as described later, the relay apparatus 1 is configured to generate the master key k3 that is uniquely determined on the basis of the pre-shared key k0. In other words, the same master key k3 is generated from the same pre-shared key k0, regardless of differences between the respective relay apparatuses 1. Therefore, the master key k3 has the same value in all of the relay apparatuses 1 of the present invention included within the area in which the encrypted communications are conducted.

The cryptographic processing module 4 generates the frame key k when it encrypts and decrypts a frame. The operation of the cryptographic processing module 4 in encrypting a frame includes the steps (s1)-(s6) as follows.

(s1) Receives a plaintext frame that is the object of the encryption from the corresponding port or from the frame relay processing unit 2.

(s2) Reads in the MAC header information k1 from the frame.

(s3) Reads in the current sequence number k2_s from the counter and increases the value of the counter by one.

(s4) Reads out the master key k3.

(s5) Using a predetermined function f, generates the frame key k=f(k1, k2_s, k3).

(s6) Encrypts the frame using the frame key k and writes the value read in (s3) into the cryptographic header 71 as the sequence number k2_r.

The operation of the cryptographic processing module 4 in decrypting a frame includes steps (r1)-(r6) as follows.

(r1) Receives an encrypted frame that is the object of the decryption from the corresponding port or from the frame relay processing unit 2.

(r2) Reads in the MAC header information k1 from the frame.

(r3) Reads in the sequence number k2_r from the cryptographic header 71 of the frame.

(r4) Reads out the master key k3.

(r5) Using a predetermined function f, generates the frame key k=f(k1, k2_r, k3). The function f is the same as the function f in step (s5).

(r6) Decrypts the frame using the frame key k.

In steps (s4) and (r4), the stored master key k3 may simply be read out, or the master key k3 may be determined on the basis of a certain calculation.

The sequence number k2 is also the sequence number k2_s managed in the cryptographic processing module 4 and is also the sequence number k2_r written into the encrypted frame, which can be represented as k=f(k1, k2, k3) using the function f mentioned above. The specific detail of the function f has different variations depending on the embodiments, as described later. In addition, since the master key k3 is determined on the basis of pre-shared key k0, it can be said that the frame key k is determined on the basis of the MAC header information k1, sequence number k2, and pre-shared key k0.

The MAC header information k1 is different in each pairing of the source and destination of a frame transmission. Therefore, the MAC header information k1 is different between communications conducted by different pairs of nodes. By using the function f with which a different frame key k is generated for a different piece of MAC header information k1, the different frame key k can be used for the communications between different nodes, realizing a high level of security.

In addition, sequence number k2 is a number that increases by one with each encryption of a frame conducted by the cryptographic processing module 4 and the data length of the sequence number k2 is sufficiently long. Therefore, the value of the sequence number k2 is different between each frame used for communications between the same pair of nodes. Accordingly, by using the function f with which a different frame key k is generated for a different sequence number k2, the different frame key k can be used for each frame, realizing a high level of security.

The generation of the frame key k as described above results in a different value of the frame key k depending on the MAC header information k1 and the sequence number k2. Therefore, without dynamically exchanging key information to replace a cryptographic key with a new one, a virtually different frame key k can be used in each frame. According to the present invention, since there is no need for dynamically exchanging key information, the implementation of a complicated protocol is not required. Also, when dynamically exchanging key information, a failure in a relay apparatus affects the entire network and cuts off the communication, whereas the failure does not affect other relay apparatuses 1 in the present invention. Therefore, the use of the frame k generated in the manner described above has the effect of satisfying all security, scalability and reliability requirements.

Several specific methods for generating the frame key k are described below.

The first method for generating the frame key k is to use a hash function h as the function f. In this method, the steps (s5) and (r5) described above are replaced with the steps (s5-1) and (r5-1) that follow.

(s5-1) Generates the frame key k=h(k1+k2_s+k3).

(r5-1) Generates the frame key k=h(k1+k2_r+k3)

In this method, general-purpose fast hash functions such as MD5 (Message Digest Algorithm 5) and SHA-1 (Secure Hash Algorithm-1) can be used as the hash function h. As long as both of the cryptographic processing modules 4 at the source and destination of the cryptographic communication use the same hash function, any hash function can be used as the hush function h.

The use of the hash function reduces the probability of the same frame key k being generated from two different combinations of (k1, k2, k3) to a negligible degree. In addition, the distribution of the values of the frame key k is expected to be uniform and random. That is, the values of the frame key k for two consecutive frames are expected to differ greatly from each other. Therefore, even when encrypted frames are intercepted, it is very difficult to guess the frame key k. Moreover, the implementation is easy since the general-purpose hash function that enables the fast calculation can be used.

Figure 10:
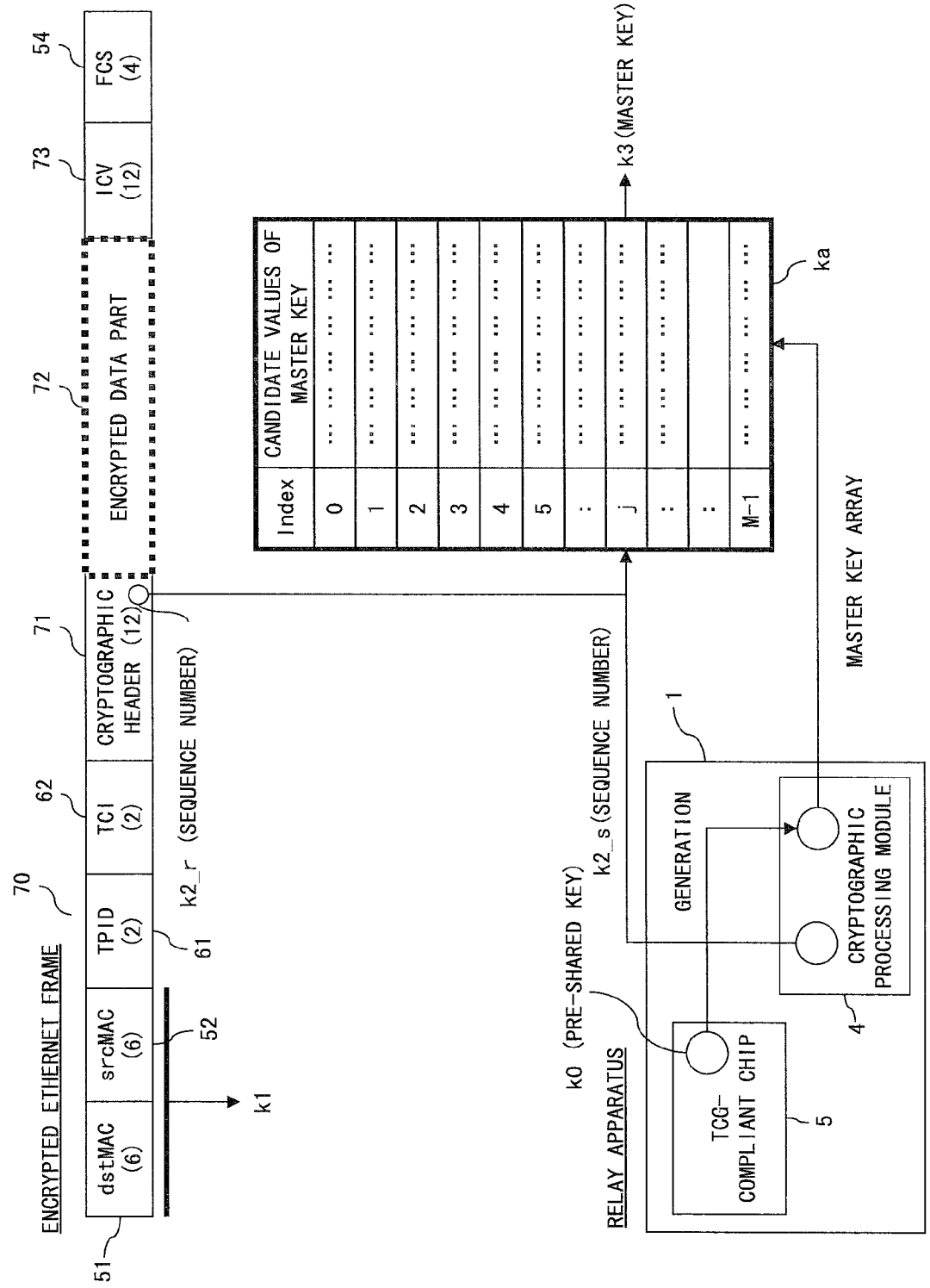
FIG. 10 shows a method for generating the key used for the cryptographic process in the present invention using an array.

The second method for generating the frame key k is to use an array. FIG. 10 describes the second method. In this method, steps (s4), (s5), (r4) and (r5) are, respectively, replaced with steps (s4-2), (s5-2), (r4-2) and (r5-2) that follow.

(s4-2) Reads out the master key k3 from the master key array ka on the basis of k2_s read in (s3).

(s5-2) Generates the frame key k=k3 XOR (k1+k2_s).

(r4-2) Reads out the master key k3 from the master key array ka on basis of k2_r read in (r3).

(r5-2) Generates the frame key k=k3 XOR (k1+k2_r).

The above steps are described in reference to FIG. 10. In FIG. 9, one master key k3 is generated from the pre-shared key k0. In FIG. 10, M number of values are generated from the pre-shared key k0 and the array of the values is stored in the cryptographic processing module 4 as the master key array ka. Hereinafter, the value stored with the subscript j in the master key array ka is expressed as ka[j] and the value of each ka[j] is referred to as a candidate value.

In step (s4-2), for example, the remainder j of k2_s divided by M may be calculated and the value of ka[j] may be read out as the master key k3. The master key k3 can be read out in step (r4-2) in the same manner. Of course, j may be determined with other methods, in accordance with the particular embodiment, in order to read out the master key k3 (=ka[j]) from the master key array ka.

In steps (s4-2) and (r4-2), since the master key k3 is calculated on the basis of the sequence number k2 (k2_s or k2_r), a different master key k3 is used in two consecutive encrypted frames and a different frame key k is used accordingly. Also, in order to make it difficult to guess the frame key k even if encrypted frames are intercepted, it is desirable for the master key array ka to be generated using a method in which the generated bit strings of ka[i] and ka[i+1] are not similar, and for M to be given a suitably large value (for example, 256).

The second method uses a simple function that enables a faster calculation than the hash function. In other words, as shown in steps (s5-2) and (r5-2), the calculation of the function f only requires the operations of addition and exclusive OR.

Therefore, the second method takes both the security of the frame key k and the calculation speed into consideration, and is suitable for Gbps-class high-speed communications.

In an environment using the VLANs as shown in FIG. 3A, a variation of the above first and second methods can be adopted. For example, in the example in FIG. 3A, the same master key k3 may be used in the VLAN 10 and VLAN 20, or different master keys k3 and k3' may also be used. In the latter case, an administrator sets the pre-shared key k0 and k0' respectively corresponding to the VLAN 10 and VLAN 20, which are the object of the encryption, in the relay apparatus 1a, and the cryptographic processing module 4a generates the master key k3 from the pre-shared key k0 and generates the master key k3' from the pre-shared key k0'. The administrator sets the pre-shared keys k0 and k0' in the relay apparatus 1b in the same manner to instruct the cryptographic processing module 4b to generate the master keys k3 and k3'. This is the variation of the first method. The second method can be modified in the same manner. That is, the cryptographic processing modules 4a and 4b each generate the two sets of the master key array ka and ka' from the two pre-shared keys k0 and k0' corresponding to VLAN 10 and VLAN 20 respectively. The cryptographic process of a frame corresponding to the VLAN 10 uses the master key array ka, and the cryptographic process of a frame corresponding to the VLAN 20 uses the master key array ka'.

Next, several methods for generating the master key k3 from the pre-shared key k0 are described. Different methods for generating the master key k3 from the pre-shared key k0 generate different frame keys k from the same pre-shared k0, MAC header information k1, and sequence number k2.

The first method for generating the master key k3 from the pre-shared key k0 is to use a function r that generates a random byte string. The function r is provided with a seed as an argument. The function r returns the same result for the same seed.

In an embodiment according to the first method, firmware in the relay apparatus 1 defines a unique character string (hereinafter referred to as a "firm character string" and represented by the symbol fs), and the cryptographic processing module 4 is allowed to refer to the firm character string fs. That is, all the cryptographic processing modules 4 in a plurality of relay apparatuses 1 in which the same firmware is embedded are allowed to refer to the same firm character string fs. The firm character string fs is only known by, for example, the manufacturer who designed the firmware and built it into the relay apparatus 1, and is kept secret to the user of the relay apparatus 1.

In addition, in this embodiment, the cryptographic processing modules (for example, 4a and 4b in FIG. 3A) used in the source and destination of an encrypted frame are supposed to contain the same firmware and to be capable of using the same function r.

The seed to be given to the function r is calculated on the basis of the firm character string fs and the pre-shared key k0. For example, the seed may be the concatenation of the firm character string fs and the pre-shared key k0 as a character string, or the exclusive OR may be calculated as the seed from the bit strings of the firm character string fs and the pre-shared key k0.

For example, suppose that the length of the master key k3 to be calculated is N bytes. If the function r is the one that returns a value that is N-bytes long, the master key k3 can be obtained by giving the seed, which is calculated in the above-described manner on the basis of the firm character string fs and the pre-shared key k0, as the argument of the function r. Alternately, when the function r is defined as the one that returns a value that is 1-byte long, N number of random byte values may be generated and concatenated in order to obtain the master key k3 of N bytes. In this case, N number of seeds are generated using N number of different values (hereinafter referred to as "index values") and N number of random byte values are generated using the N seeds. The index value may be, for example, either an integral number 1–N or another number. For example, when the index value is an integral number 1–N, the j-th seed is generated on the basis of the firm character string fs, the pre-shared key k0, and j ($1 \leq j \leq N$).

According to the first method, when the same pre-shared key k0 is set in the source and destination of an encrypted frame, the same master key k3 is generated. The seed used for generating the master key k3 is calculated on the basis of the firm character string fs that is kept secret to the user of the relay apparatus 1 and the pre-shared key k0 that is only known by the administrator. Therefore, even if a general-purpose library function is used as the function r, it is very difficult to guess the master key k3 from outside, and the master key k3 can be securely generated.

The second method for generating the master key k3 from the pre-shared key k0 is to use a hash function h. The hash function h always calculates the same hash value for the same argument.

The second method is similar to the first method except that the hash function h is used in place of the function r. In the second method, the argument of the hash function h has the value calculated on the basis of the firm character string fs and the pre-shared key k0, and the hash value obtained as the result is the master key k3. The bit alignment of the master key k3 is irregular due to the use of the hash function. Also, the master key k3 is calculated on the basis of the firm character string fs and the pre-shared key k0. Therefore, even if a general-purpose library function (such as MD5 and SHA-1) is used as the hash function h, it is very difficult to guess the master key k3 from outside, and the master key k3 can be securely generated.

The first and second methods for generating the master key k3 from the pre-shared key k0 can be modified to be applied to an embodiment that uses the master key array ka as shown in FIG. 10.

The first method for generating the master key array ka from the pre-shared key k0 is similar to the first method for generating the master key k3 from the pre-shared key k0. However, the former differs in that when the length of the master key k3 is defined as N bytes, a single master key k3 of N-bytes long is not generated but an M number of candidate values each being N-bytes long is generated and stored as ka[0]-ka[M−1].

For example, when the function r is defined as the one that returns a value that is 1-byte long, N×M number of random byte values are generated. Then, M number of the candidate values are obtained by concatenating N number of the generated random byte values to generate each candidate value of N-bytes long. And then, the candidate values are stored as ka [0]-ka [M−1]. In this case, N×M number of seeds are generated using N×M number of index values, the seeds being used as the argument of the function r.

According to this method, even if a general-purpose library function is used as the function r, it is very difficult to guess the contents of the master key array ka from outside. Therefore, the security of the master key k3 that is selected from the master key array ka is also maintained.

The second method for generating the master key array ka from the pre-shared key k0 is similar to the second method for generating the master key k3 from the pre-shared key k0. However, the former differs in that one master key k3 is not generated but M number of candidate values are generated and stored as ka[0]-ka [M−1].

In this method, M number of index values are used to generate M number of candidate values. For example, when the index values are integral numbers 1–M, the j-th candidate value, namely ka[j−1], is the hash value obtained by using the value calculated on the basis of the firm character string fs, the pre-shared key k0, and j as the argument of the hash function h (1≦j≦M).

According to this method, even if a general-purpose library function is used as the hash function h, it is very difficult to guess the contents of the master key array ka from outside. Therefore, the security of the master key k3 that is selected from the master key array ka is also maintained. Also, each value stored as ka[0]-ka[M−1] has an irregular bit alignment due to the use of the hash function. Accordingly, it is difficult to guess the master key k3 even if encrypted frames are intercepted. The security of the master key k3 is thus maintained.

Next, the division and reassembly of a frame are described with reference to FIG. 11. The relay apparatus 1 of the present invention in a preferred embodiment has the function of dividing the encrypted frame 70 and reassembling the original single frame from the plurality of divided frames. Hereinafter, this function is referred to as the "fragmentation function" and the divided encrypted frame 70 is referred to as a "fragment frame." FIG. 11 describes the format of the cryptographic header 71 for realizing the fragmentation function.

Generally, as described above, the maximum frame length defined by the Ethernet standard is 1518 bytes, and the maximum frame length of the tagged frame defined by the IEEE 802.1Q (VLAN) standard is 1522 bytes. Also, the data size of encrypted data is generally larger than plaintext data. Moreover, the encrypted frame 70 comprises the cryptographic header 71. Therefore, when the data part 53 in the frame 50 or the tagged frame 60 is encrypted, it is possible for the size of the encrypted frame 70 to exceed the maximum frame length mentioned above.

Many of the commercially available Layer 2 relay apparatuses are capable of setting the maximum frame length to more than 1518 bytes or 1522 bytes. Therefore, in a network with a mix of the relay apparatus 1 of the present invention and the conventional relay apparatus, an encrypted frame 70 longer than 1522 bytes can be sent and received by modifying the settings in the conventional relay apparatus.

For instance, in the example of FIG. 3A, when an encrypted frame 70 longer than 1522 bytes is transmitted from the relay apparatus 1a to the relay apparatus 1b, as long as the maximum frame length is appropriately set in the core L2/L3 switch 41, the encrypted frame 70 reaches the relay apparatus 1b via the core L2/L3 switch 41.

Therefore, in a case settings set in a relay apparatus can be modified as a user chooses, such as in a case where a company uses a network independently configured by the company as an office LAN for the company's own use, the use of the present invention has few problems. However, when an Ethernet network provided by a carrier is used, users are not always allowed to modify the settings of the relay apparatuses as they like. In such a case, the encrypted frame 70 may not be transmitted using the present invention due to the limit on the maximum frame length.

Accordingly, it is desirable for the relay apparatus 1 of the present invention to have a fragmentation function. In the embodiment shown in FIG. 11, the relay apparatus 1 has the fragmentation function and the cryptographic header 71 is in the format that is in accordance with the function. By using the relay apparatus 1 having the fragmentation function, even when a network path contains the conventional relay apparatuses, an encrypted frame 70 longer than the maximum frame length set in such relay apparatuses can be sent and received.

The cryptographic processing module 4 specifically operates as follows in order to realize the fragmentation function. First, the encrypted frame 70 in which size is increased as a result of encryption is divided into a plurality of fragment frames. Secondly, whether the received frame is a fragment frame or an undivided encrypted frame 70 is determined. Thirdly, when the frame is determined to be a fragment frame, all fragment frames are received and restored to the single encrypted frame 70, and the restored encrypted frame 70 is decrypted.

Figure 11:
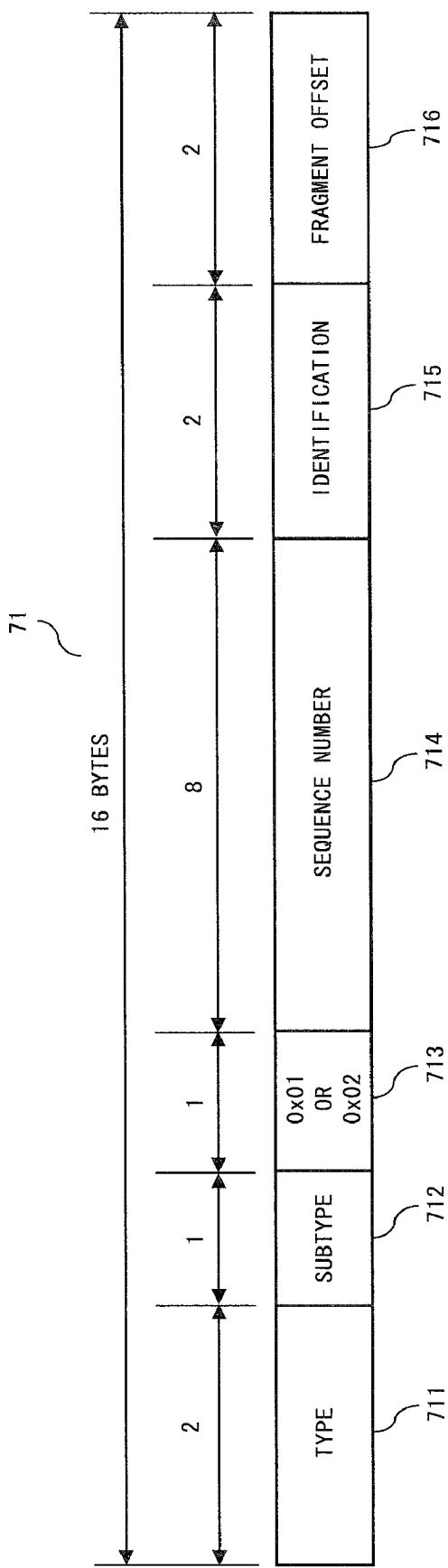
FIG. 11 shows a format of a cryptographic header whose purpose is to realize the division and reassembly of a frame.

Comparing the cryptographic headers 71 shown in FIG. 11 and in FIG. 5, the difference is that in FIG. 11, the value of the reserved field 713 is specified as 0x01 or 0x02, and the two fields, namely, an ID (Identification) 715 of 2 bytes and a fragment offset 716 of 2 bytes, are added.

In this embodiment, the value of the reserved field 713 being 0x01 or 0x02 indicates that the cryptographic header 71 is extended to 16 bytes, as in FIG. 11. The value of the reserved field 713 being 0x00 indicates that the cryptographic header 71 is 12 bytes, as in FIG. 5. Therefore, the cryptographic processing module 4 can determine the scope of the cryptographic header 71 via the value of the reserved field 713 in a received encrypted frame.

The value of the reserved field 713 in undivided encrypted frame 70 is 0x00. When a single encrypted frame 70 is divided into n number of fragment frames, the value of the reserved field 713 is 0x01 in the first to (n−1)th fragment frames, and the value is 0x02 in the n-th fragment frame.

The ID 715 is the field indicating an identification number that is assigned to each undivided encrypted frame 70. In this embodiment, a random value is generated to be used as the ID 715. When the single encrypted frame 70 is divided into n number of fragment frames, the value of the ID 715 is the same among the n number of fragment frames.

The fragment offset 716 is provided with a value indicating what number a fragment frame is in the order of bytes from the head.

Next the operations of the cryptographic processing module 4 to realize the fragmentation function using cryptographic header 71 described above are described.

The cryptographic processing module 4 operates as follows in performing the encryption. First, it determines whether or not the data length of the encrypted frame 70 exceeds the maximum frame length (1518 bytes in general Ethernet, 1522 bytes in the VLAN environment). When it exceeds the maximum frame length, the encrypted frame 70 is divided into a plurality of fragment frames. At that time, a random value is generated and copied to the ID 715 in each fragment frame. Also, the values of fragment offset 716, ICV 73 and FCS 54 are calculated for each fragment frame.

The cryptographic processing module 4 operates as follows when it receives a frame containing the cryptographic header 71. First, the value of the reserved field 713 is checked. When the value is 0x00, the received frame is determined to be an undivided encrypted frame, and the encrypted frame is decrypted. When the value of the reserved field 713 is 0x01, the received frame is determined to be either of the first, the second, . . . , or the (n−1)th fragment frame from among the divided n number of fragment frames, and the contents of the fragment frame are temporarily stored in a buffer. When the value of the reserved field 713 is 0x02, the received frame is determined to be the n-th fragment frame from among the divided n number of fragment frames and is combined with the first to the (n−1)th fragment frames stored in the buffer to reassemble the original encrypted frame, and the reassembled encrypted frame is decrypted. The reassembly is performed while checking whether or not the ID 715 is the same value in all of the n number of fragment frames, and whether or not the reassembly can be done compatibly with the values of the fragment offset 716. Also, not all of the fragment frames may be received, depending on the condition of the communication path. If all the fragment frames cannot be collected for the reassembly within a predetermined time period, the buffer is cleared.

The present invention is not limited to the above embodiments, but can be modified in various ways. Several examples are shown below.

In FIG. 4, the data part 53 including the type, etc., is regarded as the object of the encryption. However, the type, LLC header, and SNAP header may be regarded as the header information and may be exempted from the object of the encryption. In that case, the position of the cryptographic header 71 in the encrypted frame 70 may immediately follow the TCI 62, as in FIG. 4, or the TCI 62 may be immediately followed by the type, etc., which is followed by the cryptographic header 71, and further followed by the encrypted data part. The latter case is similar to the case in FIG. 4 in that the header part being exempted from the object of the encryption, the cryptographic header 71, and the encrypted data part are put in that order.

In the above embodiment, the frame key k is generated as k=f(k1, k2, k3). However, the MAC header information k1 and the master key k3 are not essential for generating the frame key k. Only the sequence number k2 is essential because it is the only element that differs in each frame transmission. Therefore, the frame key k may be generated for example by a calculation such as k=h(k2) using the hash function h.

However, in terms of the strength of the frame key k, it is desirable to also use the MAC header information k1 and the master key k3. In addition, in order to simplify the calculation to speed up the process as in FIG. 10, it is desirable to also use elements other than the sequence number k2, namely, the MAC header information k1 and the master key k3.

The function f may of course be functions other than the ones shown as examples.

While the mechanism using the fragment offset 716 is adopted in FIG. 11, the fragmentation function may be realized by adopting the cryptographic header 71 in a format different from the one in FIG. 11. For example, instead of performing the reassembly on the basis of the reserved field 713 and the fragment offset 716, information about "how many fragment frames exist in all" and information about "what number the fragment frame is, in the order of all the fragment frames" may be recorded into the cryptographic header 71 to perform the reassembly based on the information.

What is claimed is:

1. A relay apparatus that relays a frame in a data link layer, the relay apparatus comprising:
   a plurality of ports to transmit and receive the frame to and from an outside of the relay apparatus;
   a frame relay processing unit to relay the frame between two of the plurality of ports; and
   a cryptographic processing unit that
      is provided between a determined one of the plurality of ports and the frame relay processing unit;
      has a first interface to transmit and receive the frame to and from the determined one of the plurality of ports,
      has a second interface to transmit and receive the frame to and from the frame relay processing unit,
      performs an encryption process when receiving the frame from either one of the first interface or the second interface, and
      performs a decryption process when receiving the frame, which is encrypted, from the other one of the first interface or the second interface.

2. The relay apparatus according to claim 1, wherein
   when the frame contains Virtual Local Area Network identification information to identify a Virtual Local Area Network, the cryptographic processing unit determines whether to perform either the encryption process or the decryption process to the received frame, or whether not to perform either process to the received frame, according to the Virtual Local Area Network identification information.

3. The relay apparatus according to claim 1, wherein
   in the encryption process, the cryptographic processing unit encrypts a data part of the frame excluding a header, and generates the encrypted frame by disposing a cryptographic header containing information required for a decryption in a position between the header and encrypted data obtained by encrypting the data part.

4. The relay apparatus according to claim 1, wherein
   the cryptographic processing unit performs the encryption process when receiving the frame from the determined one of the plurality of ports via the first interface, and transmits the generated encrypted frame to the frame relay processing unit via the second interface, and
   the cryptographic processing unit performs the decryption process when receiving the frame from the frame relay processing unit via the second interface, and transmits the decrypted frame to the determined one of the plurality of ports via the first interface.

5. The relay apparatus according to claim 1, wherein
   the cryptographic processing unit performs the decryption process when receiving the frame from the determined one of the plurality of ports via the first interface, and transmits the decrypted frame to the frame relay processing unit via the second interface, and the cryptographic processing unit performs the encryption process when receiving the frame from the frame relay processing unit via the second interface, and transmits the generated encrypted frame to the determined one of the plurality of ports via the first interface.

6. The relay apparatus according to claim 1, wherein the cryptographic processing unit includes a number storage unit to store a sequence number, and when performing the encryption process, the cryptographic processing unit generates a cryptographic key using the sequence number, generates the encrypted frame by encrypting the frame using the cryptographic key, incorporates the sequence number into the encrypted frame, and changes a value of the sequence number stored in the number storage unit, and when performing the decryption process, the cryptographic processing unit generates the cryptographic key using the sequence number incorporated into the encrypted frame, and performs the decryption process using the cryptographic key.

7. The relay apparatus according to claim 6, wherein the cryptographic processing unit generates the cryptographic key further using Media Access Control header information obtained from either a destination Media Access Control address, a source Media Access Control address, or both, contained in the frame.

8. The relay apparatus according to claim 6, wherein the cryptographic processing unit generates the cryptographic key further using a pre-shared key that is a value preset in each of a plurality of the relay apparatuses combined to be used to transmit and receive the encrypted frame as an identical value from among the plurality of relay apparatuses.

9. The relay apparatus according to claim 8, wherein the cryptographic processing unit generates a random value by giving, as a seed, a value calculated using a character string defined uniquely by firmware in the relay apparatus and the pre-shared key to a random function that generates an identical value from a same seed, and generates the cryptographic key using the random value.

10. The relay apparatus according to claim 8, wherein the cryptographic processing unit calculates a hash value by using, as an argument of a hash function, a value calculated using a character string defined uniquely by firmware in the relay apparatus and the pre-shared key and generates the cryptographic key using the hash value.

11. The relay apparatus according to claim 6, wherein the cryptographic processing unit generates the cryptographic key using a hash function.

12. The relay apparatus according to claim 1, wherein in the encryption process, the cryptographic processing unit further divides the encrypted frame and generates a plurality of fragment frames when a length of the encrypted frame exceeds a predetermined length, and in the decryption process, the cryptographic processing unit further determines whether a received frame is the fragment frame or the undivided encrypted frame, and when determining the received frame as the fragment frame, receives all of the plurality of fragment frames corresponding to the encrypted frame before a division, and reassembles all of the plurality of fragment frames into the encrypted frame before the division.

13. The relay apparatus according to claim 1, wherein each of the first interface and the second interface is a medium independent interface or a gigabit medium independent interface.

14. The relay apparatus according to claim 1, wherein the cryptographic processing unit is provided for each of the plurality of ports.

15. The relay apparatus according to claim 1, wherein the encryption process generates an encrypted frame by encrypting the received frame and the decryption process decrypts the received frame, which is encrypted.

16. A relay apparatus that relays a frame in a data link layer, the relay apparatus comprising:

a plurality of ports to transmit and receive the frame to and from an outside of the relay apparatus;

a frame relay processing unit to relay the frame; and a cryptographic processing unit that has a first interface to transmit and receive the frame to and from one of the plurality of ports, has a second interface to transmit and receive the frame to and from the frame relay processing unit, performs an encryption process when receiving the frame from either one of the first interface or the second interface by encrypting the frame and generating an encrypted frame, performs a decryption process when receiving the encrypted frame from the other one of the first interface or the second interface by decrypting the encrypted frame, and has a number storage unit to store a sequence number, wherein when performing the encryption process, the cryptographic processing unit generates a cryptographic key using the sequence number, generates the encrypted frame by encrypting the frame using the cryptographic key, incorporates the sequence number into the encrypted frame, and changes a value of the sequence number stored in the number storage unit, when performing the decryption process, the cryptographic processing unit generates the cryptographic key using the sequence number incorporated into the encrypted frame, and performs the decryption process using the cryptographic key, the cryptographic processing unit generates M number of values, M being 2 or a larger integral number, and stores the M number of values as candidate values, according to a pre-shared key that is a value preset in each of a plurality of the relay apparatuses combined to be used to transmit and receive the encrypted frame as an identical value from among the plurality of relay apparatuses, and the cryptographic processing unit selects one of the M number of candidate values according to the sequence number, and generates the cryptographic key using the selected candidate value.

17. The relay apparatus according to claim 16, wherein the cryptographic processing unit generates, for each of M number of different index values, corresponding one of the M number of candidate values by calculating a seed using a character string defined uniquely by firmware in the relay apparatus, the pre-shared key, and the index value, and by calculating a random value by giving the seed to a random function that generates an identical value from a same seed.

18. The relay apparatus according to claim 16, wherein the cryptographic processing unit generates, for each of M number of different index values, corresponding one of the M number of candidate values by giving, as an argument of a hash function, a value calculated using a character string defined uniquely by firmware in the relay apparatus, the pre-shared key, and the index value.

19. The relay apparatus according to claim 16, wherein each of the first interface and the second interface is a medium independent interface or a gigabit medium independent interface.

20. The relay apparatus according to claim 16, wherein the cryptographic processing unit is provided for each of the plurality of ports.

* * * * *